(12) United States Patent
Sambhwani et al.

(10) Patent No.: US 11,391,817 B2
(45) Date of Patent: Jul. 19, 2022

(54) RADIO FREQUENCY (RF) OBJECT DETECTION USING RADAR AND MACHINE LEARNING

(71) Applicant: QUALCOMM Incorporated, San Diego, CA (US)

(72) Inventors: Sharad Sambhwani, San Diego, CA (US); Amichai Sanderovich, Atlit (IL); Evyatar Hemo, Kiryat Bialik (IL); Evgeny Levitan, Haifa (IL); Eran Hof, Haifa (IL); Mohammad Faroq Salama, Majd al-krum (IL); Michel Adib Sarkis, San Diego, CA (US); Ning Bi, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 16/405,793

(22) Filed: May 7, 2019

(65) Prior Publication Data

US 2019/0346536 A1 Nov. 14, 2019

Related U.S. Application Data

(60) Provisional application No. 62/720,103, filed on Aug. 20, 2018, provisional application No. 62/670,653, filed on May 11, 2018.

(51) Int. Cl.
*G01S 7/41* (2006.01)
*G01S 7/35* (2006.01)
(Continued)

(52) U.S. Cl.
CPC ............... *G01S 7/41* (2013.01); *G01S 7/352* (2013.01); *G01S 13/325* (2013.01); *G01S 13/89* (2013.01);
(Continued)

(58) Field of Classification Search
CPC .......... G01S 7/41; G01S 7/352; G01S 13/325; G01S 13/89; G01S 7/358; G06N 20/00;
(Continued)

(56) References Cited

U.S. PATENT DOCUMENTS 6,466,156 B1 10/2002 Ulander
8,026,840 B2 9/2011 Dwelly et al.
(Continued)

FOREIGN PATENT DOCUMENTS

WO 0113141 A2 2/2001

OTHER PUBLICATIONS

Adib F., et al., "Multi-Person Localization via RF Body Reflections", May 1, 2015 (May 1, 2015), XP055407283, pp. 1-14, Retrieved from the Internet: URL:http://witrack.csail.mit.edu/witrack2-paper.pdf [retrieved on Sep. 15, 2017] 3. Primer 5. Multi-Shift FMCW.
(Continued)

*Primary Examiner* — Vladimir Magloire
*Assistant Examiner* — Nazra Nur Waheed
(74) *Attorney, Agent, or Firm* — Thien T. Nguyen

(57) ABSTRACT

Embodiments described herein can address these and other issues by using radar machine learning to address the radio frequency (RF) to perform object identification, including facial recognition. In particular, embodiments may obtain IQ samples by transmitting and receiving a plurality of data packets with a respective plurality of transmitter antenna elements and receiver antenna elements, where each data packet of the plurality of data packets comprises one or more complementary pairs of Golay sequences. I/Q samples indicative of a channel impulse responses of an identification region obtained from the transmission and reception of
(Continued)

the plurality of data packets may then be used to identify, with a random forest model, a physical object in the identification region.

27 Claims, 12 Drawing Sheets

(51) Int. Cl.
  *G06N 20/00* (2019.01)
  *G01S 13/32* (2006.01)
  *G01S 13/89* (2006.01)
  *H01Q 21/08* (2006.01)
  *H04L 9/40* (2022.01)
  *G06V 40/16* (2022.01)

(52) U.S. Cl.
  CPC ........... *G06N 20/00* (2019.01); *G06V 40/166* (2022.01); *G06V 40/168* (2022.01); *G06V 40/172* (2022.01); *H01Q 21/08* (2013.01); *H04L 63/0861* (2013.01); *G01S 7/358* (2021.05)

(58) Field of Classification Search
  CPC .. G06V 40/168; G06V 40/172; G06V 40/166; H01Q 21/08; H04L 63/0861
  See application file for complete search history.

(56) References Cited

U.S. PATENT DOCUMENTS

| | | | |
|---|---|---|---|
| 9,418,306 | B2 | 8/2016 | Bae et al. |
| 9,418,342 | B2* | 8/2016 | Ghassemzadeh ........ G06N 5/04 |
| 10,291,268 | B1 | 5/2019 | Migliori et al. |
| 10,996,311 | B2 | 5/2021 | Roger et al. |
| 2011/0149773 | A1* | 6/2011 | Lee ...................... H04B 17/327 370/252 |
| 2014/0286210 | A1* | 9/2014 | Das ....................... H04W 76/28 370/311 |
| 2014/0334734 | A1* | 11/2014 | Xiong ................ G06K 9/00288 382/195 |
| 2017/0097413 | A1 | 4/2017 | Gillian et al. |
| 2017/0176575 | A1* | 6/2017 | Smits ..................... G01S 7/484 |
| 2017/0183959 | A1* | 6/2017 | Ellmauthaler ......... G01V 1/226 |
| 2018/0045815 | A1 | 2/2018 | Lilja |
| 2018/0062902 | A1* | 3/2018 | Gagiev ............... H04L 27/2666 |
| 2018/0308013 | A1 | 10/2018 | O'Shea |
| 2018/0314974 | A1 | 11/2018 | Ho et al. |
| 2018/0330518 | A1 | 11/2018 | Choi |
| 2019/0011534 | A1* | 1/2019 | Trotta ..................... G01S 13/89 |
| 2019/0317191 | A1* | 10/2019 | Santra ..................... G01S 13/86 |
| 2019/0349365 | A1 | 11/2019 | Sambhwani et al. |

OTHER PUBLICATIONS

Hastie T., et al., "The Elements of Statistical Learning: Data Mining, Inference and Prediction," Springer, New York, NY, USA, 2009, Neural Networks, pp. 389-416, Principal Components, pp. 534-552, Random Forests, pp. 587-604.

http://luthuli.cs.uiuc.edu/~daf/courses/AML-18/learning-book-19-April-18.pdf.

International Search Report and Written Opinion—PCT/US2019/031261—ISA/EPO—dated Jul. 19, 2019.

Khan U.M., et al., "A Deep Learning Framework using Passive WiFi Sensing for Respiration Monitoring", Globecom 2017—IEEE Global Communications Conference, 2017, 7 pages.

Vapnik V., "Estimation of Dependences Based on Empirical Data: Information Science and Statistics," Springer New York, NY, USA, 2006, 44 Pages.

Vapnik V. N., "Statistical Learning Theory," Wiley-Interscience, 1998, Neural Networks, pp. 395-399, Examples of SV Machines for Pattern Recognition and Support Vector Method for Transductive Inference, pp. 430-434.

Weston J., et al., "Inference with the Universum," Proceedings of the 23rd International Conference on Machine Learning, 2006, pp. 1009-1016.

Zeng Y., et al., "Poster Abstract: Human Tracking and Activity Monitoring Using 60 GHz mmWave", 2016 15th ACM/IEEE International Conference on Information Processing in Sensor Networks (IPSN), IEEE, Apr. 11, 2016 (Apr. 11, 2016), XP032896128, pp. 1-2, DOI: 10.1109/IPSN.2016.7460704 [retrieved on Apr. 26, 2016] the whole document.

Zeng Y., et al., "WiWho: WiFi-Based 1-7, Person Identification in Smart Spaces", 2016 15th ACM/IEEE International Conference on Information Processing in Sensor Networks (IPSN), IEEE, Apr. 11, 2016 (Apr. 11, 2016), XP032896154, pp. 1-12, DOI: 10.1109/IPSN.2016.7460727 [retrieved on Apr. 26, 2016] III. Overview of WiWho V. CSI Preprocessing and Walking Detection.

Zhang J., et al., "WiFi-ID: Human Identification Using WiFi Signal", 2016 International Conference on Distributed Computing in Sensor Systems (DCOSS), IEEE, May 26, 2016 (May 26, 2016), XP032942937, pp. 75-82, DOI: 10.1109/DCOSS.2016.30 [retrieved on Aug. 8, 2016] III. Channel State Information VI. Signal Separation VIII. Classification.

* cited by examiner

RADIO FREQUENCY (RF) OBJECT DETECTION USING RADAR AND MACHINE LEARNING

CROSS-REFERENCES TO RELATED APPLICATIONS

This application claims the benefit of U.S. Provisional Application No. 62/670,653, filed May 11, 2018, entitled "RADIO FREQUENCY (RF) SENSING USING 60 GHZ RADAR AND MACHINE LEARNING", and U.S. Provisional Application No. 62/720,103, filed Aug. 20, 2018, entitled "RADIO FREQUENCY (RF) SENSING USING 60 GHZ RADAR AND MACHINE LEARNING," both of which are assigned to the assignee hereof, and incorporated by reference herein in their entirety.

BACKGROUND

Facial identification can be utilized by a variety of different types of electronic devices (such as mobile phones, tablets, laptops, PCs, televisions, and other electronic devices) for authentication and/or other functions. This identification is typically done using a camera with an optical depth sensor to enable 3-D imaging (to avoid simple hacking by showing a 2-D image) and improve performance of the verification due to the fusion between the two sensors. The technique of using a camera with an optical depth sensor can be applied more broadly to identify objects other than (or in addition to) human faces.

These identification techniques are not without their drawbacks, however. The utilization of a camera and an optical depth sensor can use a relatively large amount of power compared with other sensors, which can make it undesirable for use in devices that are power sensitive (such as mobile phones and other devices). Additionally, the sensors can be very light-sensitive, making identification difficult under diverse light conditions. Moreover, the use of a camera can also raise privacy concerns, and there may be legal implications for capturing and/or storing video and/or images captured by the camera.

SUMMARY

Embodiments described herein can address these and other issues by using radar machine learning to address the radio frequency (RF) to perform object identification, including facial recognition. In particular, embodiments may obtain IQ samples by transmitting and receiving a plurality of data packets with a respective plurality of transmitter antenna elements and receiver antenna elements, where each data packet of the plurality of data packets comprises one or more complementary pairs of Golay sequences. I/Q samples indicative of a channel impulse responses of an identification region obtained from the transmission and reception of the plurality of data packets may then be used to identify, with a random forest model, a physical object in the identification region.

An example of a method of performing object recognition using radio frequency (RF) signals at an electronic device, according to the description, comprises obtaining a set of I/Q samples by wirelessly transmitting, with the electronic device within a scanning period, a plurality of data packets with a plurality of transmitter antenna elements and receiving the plurality of data packets at a plurality of receiver antenna elements, such that each receiver antenna element of the plurality of receiver antenna elements receives at least one data packet from each transmitter antenna element of the plurality of transmitter antenna elements, wherein each data packet of the plurality of data packets comprises a complementary pair of Golay sequences, and each I/Q sample is indicative of a channel impulse response of at least a portion of an identification region, the channel impulse response obtained from a packet transmitted by a transmitter antenna element and received by a receiver antenna element. The method further includes selecting, with a processing unit of the electronic device, values from a sample subset from the set of I/Q samples, and using, with the processing unit of the electronic device, a random forest model on the selected values from the sample subset to identify a physical object in the identification region.

An example electronic device, according to the description, comprises a plurality of transmitter antenna elements, a plurality of receiver antenna elements, a memory, and a processing unit communicatively coupled with the plurality of transmitter antenna elements, the plurality of receiver antenna elements, and the memory. The processing unit is configured to obtain a set of I/Q samples by wirelessly transmitting, within a scanning period, a plurality of data packets with the plurality of transmitter antenna elements and receiving the plurality of data packets at the plurality of receiver antenna elements, such that each receiver antenna element of the plurality of receiver antenna elements receives at least one data packet from each transmitter antenna element of the plurality of transmitter antenna elements, wherein each data packet of the plurality of data packets comprises a complementary pair of Golay sequences, and each I/Q sample is indicative of a channel impulse response of at least a portion of an identification region, the channel impulse response obtained from a packet transmitted by a transmitter antenna element and received by a receiver antenna element. The processing unit is further configured to select from a sample subset from the set of I/Q samples, and use a random forest model on the selected values from the sample subset to identify a physical object in the identification region.

An example device, according to the description, comprises means for obtaining a set of I/Q samples by wirelessly transmitting, within a scanning period, a plurality of data packets with a plurality of transmitter antenna elements and receiving the plurality of data packets at a plurality of receiver antenna elements, such that each receiver antenna element of the plurality of receiver antenna elements receives at least one data packet from each transmitter antenna element of the plurality of transmitter antenna elements, wherein each data packet of the plurality of data packets comprises a complementary pair of Golay sequences, and each I/Q sample is indicative of a channel impulse response of at least a portion of an identification region, the channel impulse response obtained from a packet transmitted by a transmitter antenna element and received by a receiver antenna element. The device further includes means for selecting values from a sample subset from the set of I/Q samples, and means for using a random forest model on the selected values from the sample subset to identify a physical object in the identification region.

An example non-transitory computer-readable medium, according to the description, has instructions embedded thereon for performing object recognition using radio frequency (RF). The instructions, when executed one or more processing units cause the one or more processing units to obtain a set of I/Q samples by wirelessly transmitting, with a electronic device within a scanning period, a plurality of data packets with a plurality of transmitter antenna elements and receiving the plurality of data packets at a plurality of receiver antenna elements, such that each receiver antenna element of the plurality of receiver antenna elements receives at least one data packet from each transmitter antenna element of the plurality of transmitter antenna elements, wherein each data packet of the plurality of data packets comprises a complementary pair of Golay sequences, and each I/Q sample is indicative of a channel impulse response of at least a portion of an identification region, the channel impulse response obtained from a packet transmitted by a transmitter antenna element and received by a receiver antenna element. The instructions, when executed one or more processing units, further cause the one or more processing units to select values from a sample subset from the set of I/Q samples, and use a random forest model on the selected values from the sample subset to identify a physical object in the identification region.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

It can be noted that, although embodiments described herein are often described in the context of RF-based facial recognition, embodiments are not so limited. Embodiments may be used for object detection and/or identification. Moreover, in the embodiments described herein, the terms "detection," "recognition," "identification," and variants thereof are used interchangeably. In practice, functionality distinctions (e.g., detecting the presence an object type vs. identifying a specific instance of an object type) may be made depending on the type of data used to train a machine-learning model.

Figure 1:
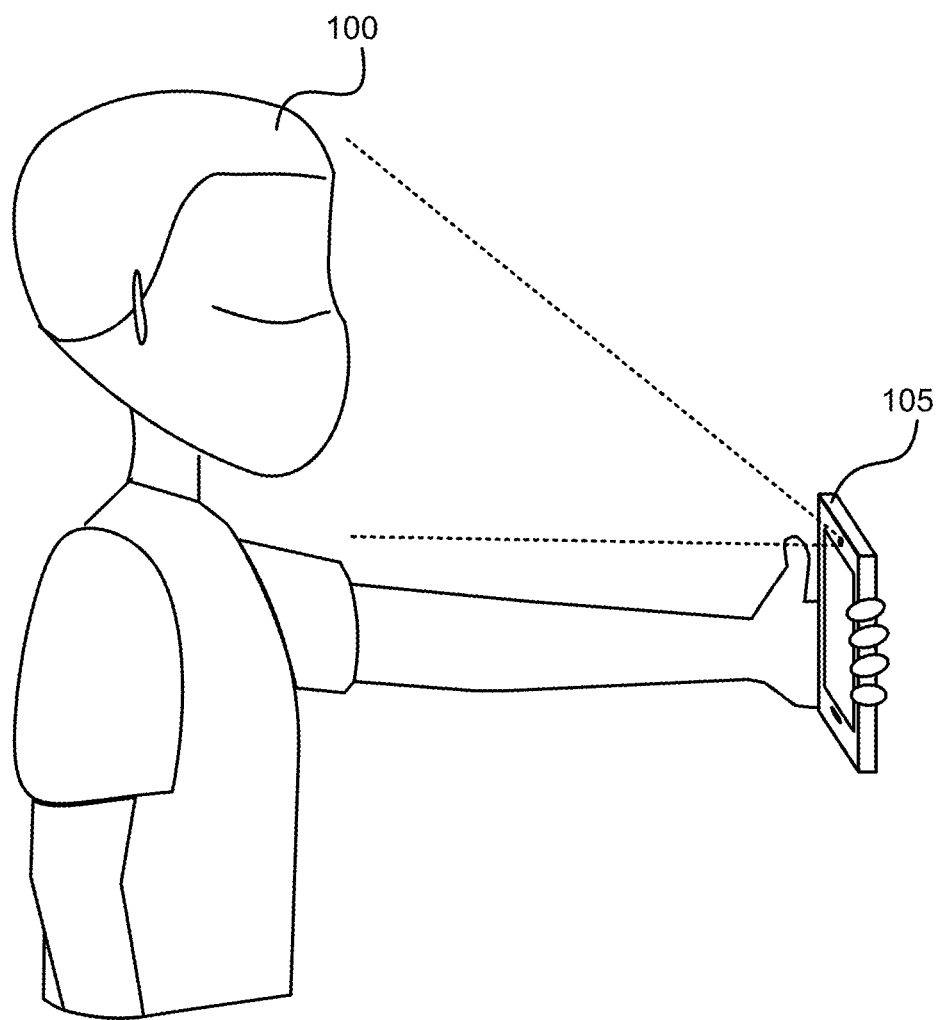
FIG. 1 is a simplified figure of a scenario in which facial recognition of a user may be implemented by an electronic device, according to an embodiment.

FIG. 1 is a simplified figure of a scenario in which facial recognition of a user 100 may be implemented by an electronic device 105. As previously noted, such facial recognition can be used for authentication of various functions performed by the electronic device 105 (e.g., unlocking the device for use, providing authentication for a particular software application (or "app"), and the like). Although illustrated as a mobile phone in FIG. 1, alternative embodiments of an electronic device 105 may include any of a variety of electronic devices in which facial recognition or, more broadly, object identification, may be used. This can include, for example, mobile phones, tablets, laptops, PCs, televisions, security devices (e.g., cameras, access points, etc.) and other electronic devices.

As previously noted, however, camera-based object identification (including facial recognition) may have its drawbacks, including relatively high power usage and dependency on lighting conditions. For example, cameras may be unable to function effectively in low light conditions, and may be unable to operate in dark conditions. Moreover, the use of a camera can also raise privacy concerns, and there may be legal implications for capturing and/or storing video and/or images captured by the camera. The use of RF scanning (e.g., radar), on the other hand, can alleviate some of these drawbacks.

Figure 2:
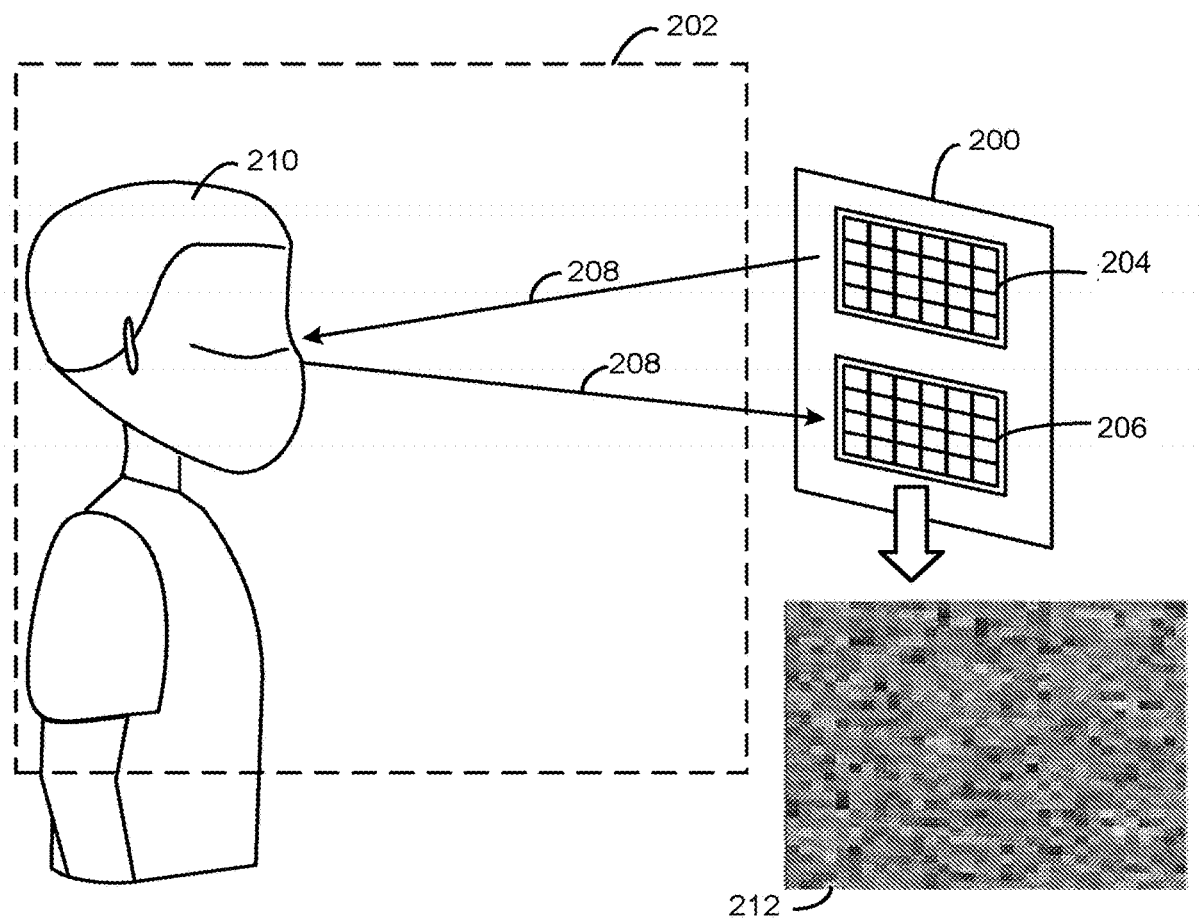
FIG. 2 is a simplified drawing illustrating the general process of collecting radio frequency (RF) image data, according to an embodiment.

FIG. 2 is a simplified drawing provided to help illustrate the general process of collecting radio frequency (RF) image data, according to an embodiment. (To reduce clutter and show how an RF imaging component 200 of an electronic device 105 may be configured, the electronic device 105 is not shown.) Here, an RF imaging component 200 is used to capture the RF image data by sampling an identification region 202, in a manner described below. The RF imaging component 200, when used with a machine-learning components as described in the embodiments provided herein, may be part of a RF-based object recognition system of the electronic device 105.

The RF imaging component 200 may comprise two antenna arrays: a transmitter antenna array 204 comprising a plurality of transmitter antenna elements, and a receiver antenna array 206 comprising a plurality of receiver antenna elements. The number and configuration of antenna elements in each of the transmitter antenna array 204 and receiver antenna array 206 may vary, depending on desired functionality. Moreover, the RF imaging component 200 may be multi-functional. That is, the RF imaging component 200 may be utilized in other applications, such as digital communication applications. And as such, the number and configuration of antenna elements in the RF imaging component 200 may be at least partially determined by the one or more additional functions of the RF imaging component

200. In some embodiments, for example, the RF imaging component 200 may be utilized as a transceiver for a IEEE 802.11ad and/or IEEE 802.11ay wireless modem, which may be utilized by the electronic device 105 to enable the electronic device to communicate using IEEE 802.11ad/ay technologies. In some embodiments, the RF imaging component 200 may be utilized as a transceiver for communication using the fifth generation (5G) new radio (NR) standard. In other embodiments, the RF imaging component 200 may be used to communicate using other technologies.

During a scanning period (described in more detail below), the RF imaging component 200 can use full-duplex radar by transmitting radio signals 208 from the transmitter antenna array 204, which may be reflected by an object 210 (e.g., the user 100 of FIG. 1 or some other object) and received by the receiver antenna array 206. The radio signals 208 may comprise a plurality of data packets, including chip signals (e.g., as transmitted using Frequency Modulated Continuous Wave (FMCW)), that are transmitted by different transmitter antenna elements of the transmitter antenna array 204 and received by different receiver antenna elements of the receiver antenna array 206, such that a different transmitter/receiver antenna pair is used for each packet.

In some embodiments, data packets may be transmitted such that each receiver antenna elements receives a packet transmitted from each transmitter antenna element. In an embodiment in which the transmitter antenna array 204 and the receiver antenna array 206 each comprise 32 antenna elements, for example, this would result in the transmission and receipt of 1024 (32×32) data packets.

The use of this many antenna elements in an RF imaging component 200 with a relatively small form factor (that may be used, for example, in a mobile phone), and the ability to detect relatively fine features on an object 210, may be made possible by utilizing gigahertz-range frequencies. In some embodiments, for example, signals in the 60 GHz medium (generally recognized as frequencies from 58-64 GHz) may be used. This can result in antenna elements that are only 2.5 mm wide. With a relatively large number of antenna elements, RF signals 208 may be generated in a relatively narrow beams for both transmission and reception, which can be beneficial for purposes of object identification described herein. (The use of multiple antenna elements may be beneficial in certain communication applications to compensate for the relatively high free space path loss in the 60 GHz medium.) In other embodiments, additional or alternative frequencies may be used. In some embodiments, for example, 5G frequency bands (e.g., 28 GHz) may be used.

Figure 3:
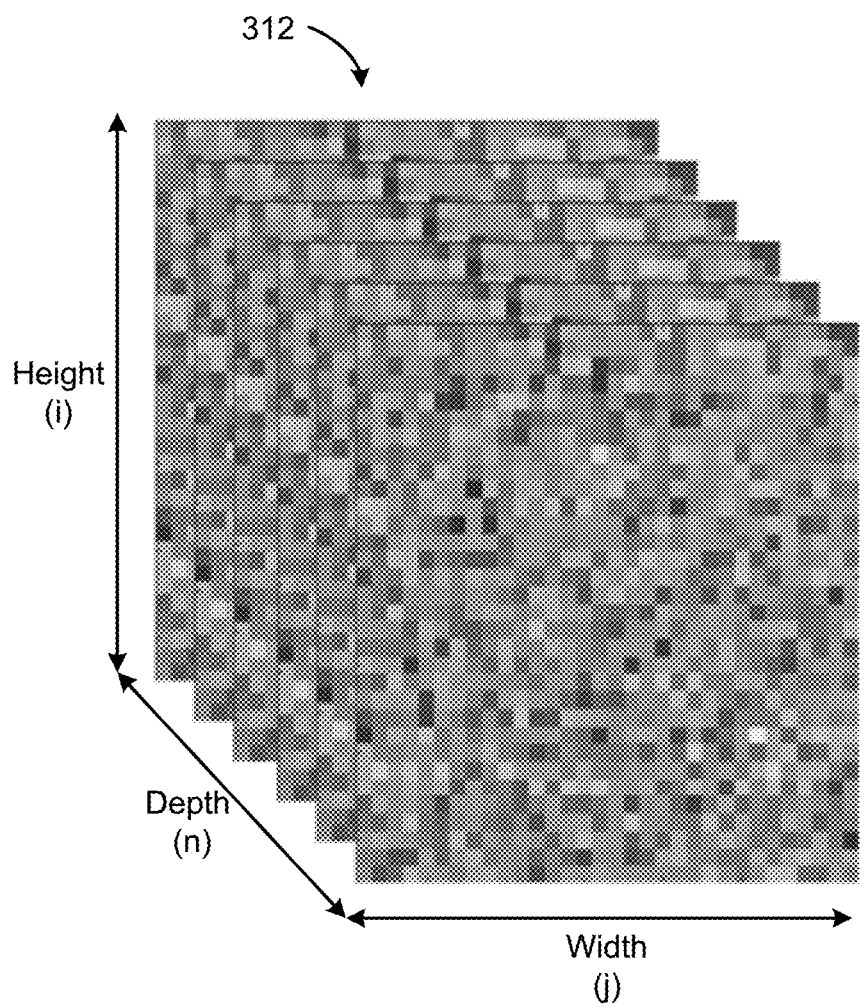
FIG. 3 is a visual representation of a 3-D RF image, according to an embodiment.

For each data packet received at the receiver antenna array 206, complex I/Q samples may be obtained, indicative of a channel impulse response (CIR) for the respective transmitter/receiver antenna pair used to transmit/receive the data packet. Collectively, these I/Q samples may comprise an "RF image" 212 that, as shown in FIG. 2, may be represented visually as being similar to a traditional image comprising a 2-D array of pixels. Additionally, as illustrated in FIG. 3, a scan may further include multiple "taps," or range bins, to represent depth information, which may be based on the CIR. This allows an RF image 312 to represent a scan of a 3-D space (illustrated as an identification region 202 in FIG. 1). Thus, in contrast to a traditional image in which pixels may be represented by a color and brightness, each pixel of the RF image 212 data may comprise complex data represented by a combination of Amplitude (A), In-phase (I), and Quadrature phase (Q) as follows:

$$p_{ij}=[A_1 \ldots {}_n{}^{ij} I_1 \ldots {}_n{}^{ij} Q_1 \ldots {}_n{}^{ij}]$$ (Expression 1)

In Expression 1, $p_{ij}$ is a pixel having pixel indices (i, j) along respective height and width dimensions at each depth of 3-D RF image 312. The number n is a number of range bins to represent depth information of RF image 312. In some embodiments, for example, CIR can span 8 channel taps, and each channel tap corresponds to a delay of 0.26 ns or a range of 4.26 cm, which can represent depth. In the case an RF image 312 with a height of 32 pixels, width of 32 pixels, and depth of 8 pixels, comprises 8,192 pixels comprising complex I/Q samples.

A Digital Signal Processor (DSP) or other processing unit may be communicatively coupled with the RF imaging component 200 (e.g., incorporated into an electronic device 105 together with the RF imaging component 200) and may coordinate the transmission and receipt of data packets. Here, because the RF imaging component 200 may be utilized in communication applications, the packets may be encoded and decoded in a manner similar to communication applications (rather that of traditional radar applications), which can help ensure efficient use of related hardware and/or software. As indicated elsewhere herein, RF imaging component 200 may be utilized for communication purposes. And thus, it may be configured to multiplex between communication and radar modes, transmitting communication data packets and radar data packets as needed.

According to some embodiments, the data packets transmitted by the transmitter antenna array 204 may comprise one or more complementary pairs of Golay sequences. Traditional radar techniques may use linear FMCW, m-sequence, Ipatov, and/or other CIR estimation techniques. However, the use of Golay sequences can be superior in both accuracy and power consumption to alternative techniques, such as FMCW.

According to the 802.11ad and 802.11ay specifications, a packet structure may comprise, among other things, a Channel Estimation Field (CEF) with complementary pairs of Golay sequences. Thus, according to embodiments, the data packets transmitted by the transmitter antenna array 204 and received by the receiver antenna array 206 may comprise these CEF fields. In fact, because no data (other than the Golay sequences) is transmitted, other fields in the packet structure may be dropped, thereby reducing the size and length of the packet, which can increase scanning speed and decrease power consumption. When complementary pair sequences are received by any antenna element of the receiver antenna array 206, the receive signal is cross correlated with each of the complementary pair sequences and the cross-correlator outputs are added, resulting in a delta function that provides a very good CIR property. This can be helpful in a variety of aspects, including reducing adverse effects to Doppler shift. For embodiments utilizing the 60 GHz medium, for example, object detection may be performed on particularly fast-moving objects (e.g., on the order of 108 km/h, or 30 m/s).

Figure 4:
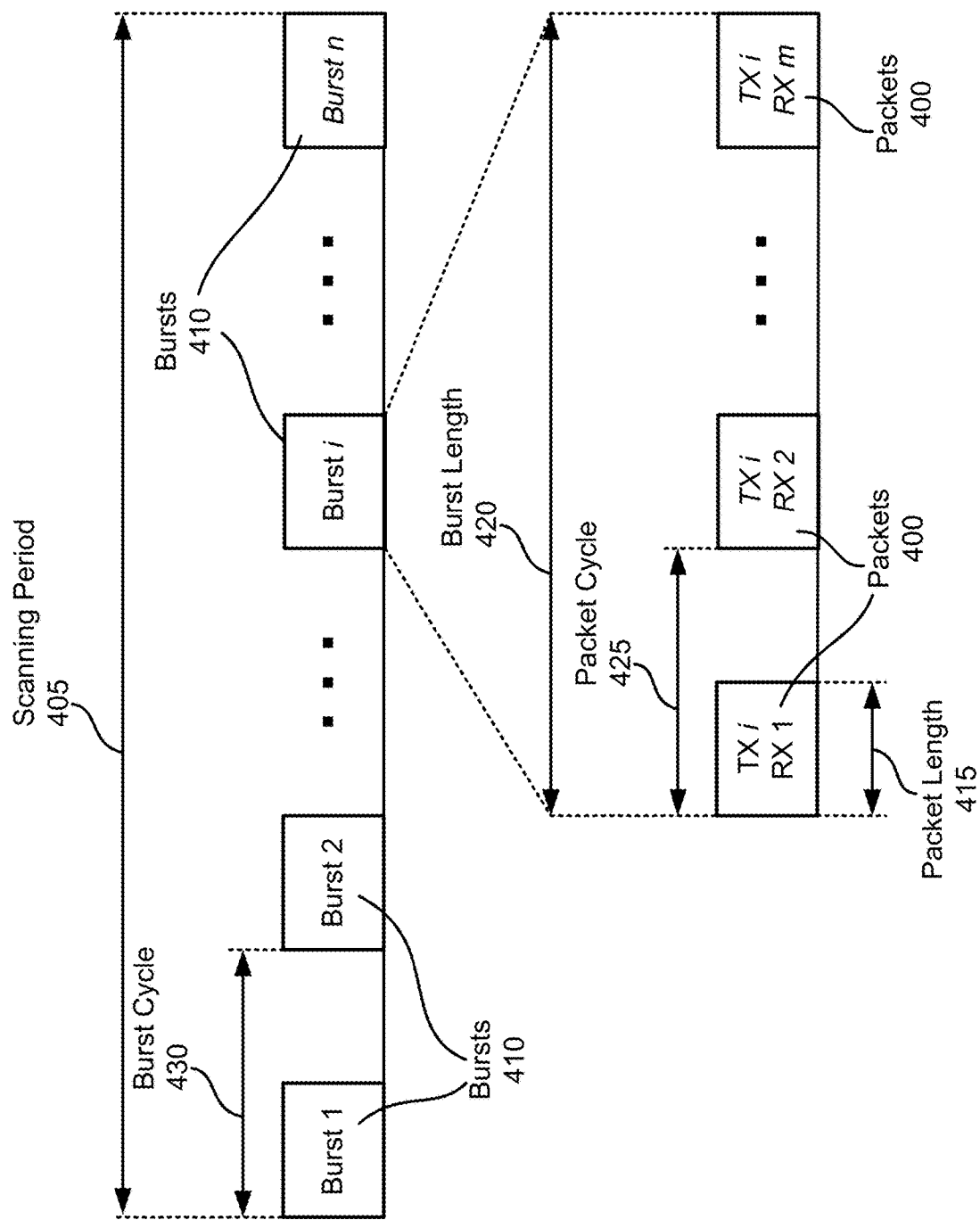
FIG. 4 is an illustration of how packets may be transmitted during a scanning period, according to an embodiment.

FIG. 4 is an illustration of how packets 400 may be transmitted during a scanning period, according to an embodiment. Here, packets 400 are transmitted in a way such that each of m receiver antenna elements (from RX 1 to RX m) receives a packet transmitted by each of n transmitter antenna elements (from TX 1 to TX n). Specifically, over the course of a scanning period 405, n "bursts" 410 are transmitted, a burst for each of n transmitter antenna elements. For a given burst i, the ith transmitter antenna element transmits m packets 400, a packet for each of m receiver antenna elements, which are turned on sequentially as illustrated. This way, a packet (also known as a "pulse") is shared between every possible transmitter/receiver antenna pair in the group of m transmitter antenna elements and n receiver antenna elements.

As previously indicated, packets 400 may comprise one or more complementary pairs of Golay sequences, which may vary in length, depending on desired functionality. In some embodiments, the packet length 415 may be less than 6 µs. In some embodiments, the packet length 415 may be less than 1 µs. Where the packet comprises a CEF field of a 802.11ad packet, for example, the CEF field is 0.655 µs. And where the packet comprises a CEF field of a 802.11ay packet, the CEF field is 0.727 µs.

Not only may the packet length 415 vary, but also the burst length 420 and scanning period 405, depending on desired functionality. The burst length 420 may be dependent not only on the packet length 415, but also the packet cycle 425. In FIG. 4, the packet cycle 425 comprises a roughly 50% duty cycle between transmission of packets 400 and periods between transmissions. Burst cycle 430 illustrates a similar duty cycle between bursts. However, the duty cycles of the packet cycle 425 and/or burst cycle 430 may be adjusted to accommodate different burst lengths 420 and/or scanning periods 405. The length of the scanning period 405 may be adjusted to accommodate periods in which the transmitter antenna array 204 and/or receiver antenna array 206 may be utilized for other functions, such as communication.

Additionally or alternatively, channel coherence time may be a factor when determining a length of scanning period 405. Channel coherence time refers to a period of time in which CIRs collected during the scanning period 405 stay roughly the same. Generally speaking, the smaller the scanning period 405, the less channel coherence time is an issue. In many applications, such as facial recognition, channel coherence time tends to be on the order of 100 ms or so. However, embodiments allow for scanning period 405 to be orders of magnitude smaller. For example, in an embodiment having a 32-element transmitter antenna array 204 and a 32-element receiver antenna array 206, the scanning period 405 would be just over 8 ms in instances where packet length 415 is 1 µs and both burst cycle and packet cycle had a duty cycle of 50%. Embodiments in which only a subset of the transmitter antenna array 204 and/or 32-element receiver antenna array 206 is used, and embodiments with smaller antenna arrays, may have even shorter scanning periods.

It will be understood that the packet transmitting technique illustrated in FIG. 4 is an example, and other transmission techniques may be used in alternative embodiments. For example, in some embodiments, different transmitters may transmit packets 400 within a single burst 410 and different bursts 410 may correspond to a respective receiver antenna elements. In some embodiments, rather than exhausting all possible transmitter/receiver antenna pairs between a transmitter antenna array 204 and receiver antenna array 206, embodiments may use only a portion of available transmitter antenna elements and/or receiver antenna elements.

According to some embodiments, analog and/or digital beamforming may be used on the receiving side. That is, different weights may be applied to different CIRs of a scan to allow digital synthesizing of a beam in a particular direction with a certain azimuth and elevation. Depending on the available hardware and/or software used to perform the beamforming, weights may be applied to CIRs with floating-point accuracy, allowing for high precision beamforming often not available with analog beamforming.

According to embodiments herein, once the scanning period is complete and CIRs have been obtained, the resulting I/Q samples (or real values derived therefrom) may comprise a feature vector that can be analyzed using machine learning techniques to identify an object in an identification region 202.

The results of the determination may be provided in any of a variety of ways. Machine learning may be implemented by hardware and/or software components of an electronic device (e.g., electronic device 105 of FIG. 1), and may therefore be used to alter the functionality of the electronic device. As indicated previously, object identification may be used for user authentication of the electronic device (e.g., using facial recognition) and/or a separate device communicatively coupled with the electronic device. In some embodiments, an indication of the determination that an object has been identified may be provided by the hardware and/or software executing the machine learning to software executed by the electronic device (e.g., a software application, operating system, firmware, etc.) and/or a hardware component (e.g., a security chipset, modem, etc.) of the electronic device.

As previously noted, machine-learning techniques as described herein ma y be implemented in hardware and/or software. In some embodiments, training of machine-learning models may be conducted by a device manufacturer, software provider, or other non-consumer entity and subsequently implemented in and/or uploaded to the electronic device. Additionally or alternatively, such training may be conducted by an end-user. In some embodiments (e.g., in embodiments in which a machine-learning model is implemented in software and/or programmable hardware) the training of the machine-learning model may be conducted on a device separate from the electronic device to which the machine-learning model may be uploaded for subsequent use in RF-based object identification. A person of ordinary skill in the art will appreciate the various ways in which training, testing, and implementation of machine-learning models may be conducted. Examples of embodiments using two different types of machine-learning models are provided in further detail below.

Multi-Class Random Forest Classifier

Figure 5:
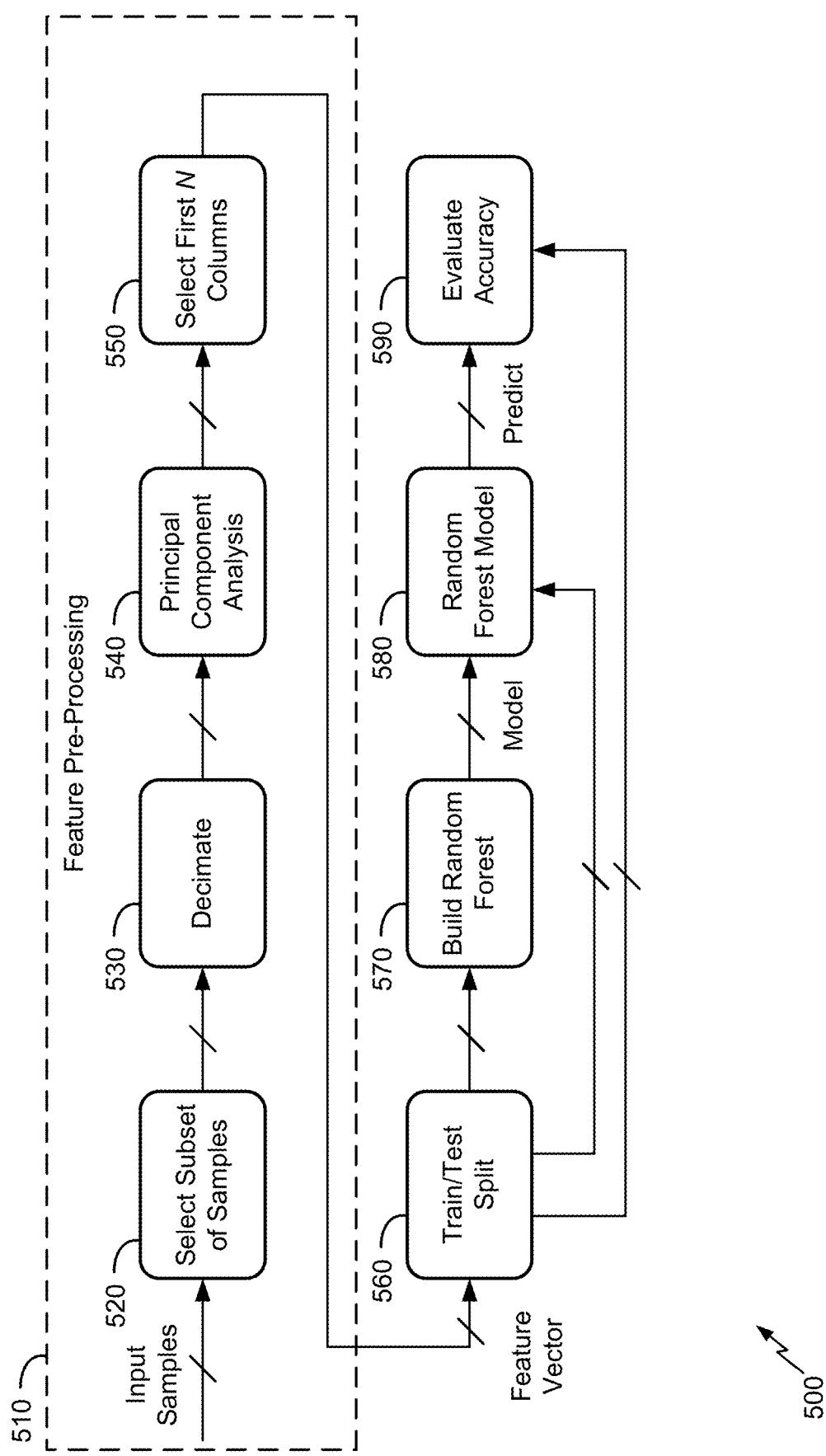
FIG. 5 is a block diagram illustrating and embodiment of a basic process of how an RF image recognition system that utilizes a multi-class random forest classifier can be trained.

FIG. 5 is a block diagram illustrating the basic process 500 of how an RF image recognition system that utilizes a multi-class random forest classifier can be trained, according to an embodiment. It will be understood, however, that embodiments can vary from the process illustrated in FIG. 5. In particular, any of a variety of feature pre-processing steps may be taken in addition or as an alternative to the feature pre-processing steps 510 illustrated in FIG. 5. A person of ordinary skill in the art will appreciate that alternative embodiments may include additional or alternative variations. One or more of the functions illustrated in FIG. 5 may be performed by a processing unit (e.g., a digital signal processor (DSP)) of an electronic device, such as the electronic device 1100 illustrated in FIG. 11 and described below.

Generally put, feature pre-processing functions 510 are used to reduce the amount of samples to process, thereby reducing the needed processing resources and/or time. At block 520, a subset of input samples (e.g., the I/Q samples discussed in FIG. 5 above) are selected. Here, for example, the samples selected may correspond to samples of certain range bins in which the object is (or likely is) located. In other words, certain range bins of a 3-D RF image (e.g., RF image 312 of FIG. 3) corresponding to depths in which the object is not likely located can be ignored (i.e., not selected at block 520).

The selected subset of samples at block 520 may then be further decimated at block 530. The decimation may comprise a downsampling of the selected subset of samples where every $n^{th}$ sample of the selected subset the samples, and where n is a number chosen on the amount of decimation desired (e.g., 2, 5, 10, 24, 36, 64, etc.). Additionally or alternatively, decimation may be random (e.g., where one sample is selected randomly from every m samples of the selected subset of samples). In some embodiments, decimation may additionally or alternatively be chosen to try to reduce correlation (e.g., maximize diversity) among samples. This can be done, for example, based on knowledge of where transmitter/receiver pairs corresponding to the various samples may be physically located with respect to each other (e.g., selecting transmitter/receiver pairs that are relatively far away from each other so that the I/Q samples are not correlated).

Samples after decimation are then subject to a Principal Component Analysis (PCA), at block 540. As a person of ordinary skill in the art will appreciate, a PCA is a statistical procedure that uses an orthogonal transformation to convert a set of observations of possibly correlated variables (entities each of which takes on various numerical values) into a set of values of linearly uncorrelated variables called principal components. That is, it is a way in which samples may be ordered in order of importance to diversity of a signal. Output samples are provided in a "score vector," with the relatively important samples appearing in the first columns of the vector. Thus, in the process illustrated in FIG. 5, the samples subject to the PCA are reordered in order of relative "importance" to the RF image captured by the samples. The first N columns of output score vector of the PCA may then be selected at block 550 to test and train a random forest model.

The value of N may be set based on a desired variation of samples, and may be dynamic or static, depending on desired functionality. For example, in certain embodiments N may be a static number based on trial and error, heuristics, and/or desired choice. In some embodiments, N may be a number that is selected dynamically to ensure that X % of variation is captured, where the value of X can be set (e.g., 85%-95%) to provide a balance between sample reduction and resulting accuracy of the random forest model. And thus, the corresponding value of N may change for each sample set.

What remains is an ordered feature vector in which each "feature" in the vector comprises a linear combination of I/Q samples of the remaining sample set and/or a value derived therefrom (e.g., a complex value may be converted to one or more real values). The feature vector may then be subject to a training or testing split, at block 560, in which the feature vector is either used for training or used for testing. According to traditional machine learning techniques, for a data set comprising a plurality of observations where each observation results in the capture of an RF image, feature vectors from a majority of the observations are used to train a classifier, while feature vectors of a minority of the observations are used to test the model. According to some embodiments, for example, a feature vector will be used to train a random forest model 80% of the time, while the other 20% are used to test the trained model. Alternative embodiments, however, may utilize a differently-proportioned split, depending on desired functionality.

If selected for training, the feature vector is then used to train a random forest model at block 570. The inventors have found a multi-class classifier comprising a random forest model (also known as a random decision forest model) can be particularly accurate at object recognition from the radar samples, and may provide lower complexity (and potentially lower power usage) over alternative machine-learning techniques. Put simply, each decision "tree" of the random forest model may be created by selecting random features "samples" in a feature vector, comparing them with random thresholds, then selecting a different "branch" based on the result of the comparison. (E.g., if the value is greater than the random threshold, the right branches selected, otherwise the left branches selected.) After being compared with random thresholds at each branch, the randomly-selected features will result in a the selection of a particular "leaf" of the tree (when the branches are exhausted). Once the trees of the forest have been created, feature vectors of different objects will traverse the random forest model differently.

A random forest model ultimately performs object detection by looking at the resulting leaves from a feature vector of a scanned object. Different objects will have different leaf combinations throughout the trees of the random forest model. An object may therefore be identified when, after determining a particular leaf combination for a particular object (e.g., from having trained on feature vectors of the object), the leaf combination (or a portion thereof) is subsequently detected from a feature vector. When testing, if a feature vector results in leaves of a certain number of trees (e.g., a majority, a certain percentage, etc.) matching the leaves of a particular trained object, the random forest model me output a detection of the object. The number of trees may be adjusted, depending on desired accuracy.

A person of ordinary skill in the art will appreciate how random forest models to be generated. The number of trees and tree depth may vary, for example, depending on desired functionality. In some embodiments, the random forest model may be built with 30 trees, where each tree has a maximum tree depth of 16 levels of branches. Alternative embodiments may have a larger or smaller number of trees and/or a larger or smaller number of tree depths, which may vary, depending on factors such as desired accuracy, available processing resources, object type, and the like.

The process at block 570 results in the creation of the random forest model which can be tested at block 580 (using feature vectors reserved for testing). When a testing feature vector evaluated by the random forest model matches a particular object above a certain threshold (e.g., the resulting leaves for the testing feature vector of more than a majority of trees in the random forest model match those of the particular object), the random forest model can output a prediction that the particular object has been identified. This prediction can then be evaluated at block 590. In the case of facial recognition, for example, a face identifier predicted by the random forest model can be compared with the actual face identifier for the data. The results of the evaluation data set can be used to optimize the random forest model parameters (e.g., number of trees, tree depth, etc.), to increase the accuracy of the random forest model.

Depending on the number of trees in the random forest model, tree depths, matching thresholds, and similar factors, the resulting accuracy of the random forest model for RF-based object detection can be quite high. However, in some applications additional classifiers may be used to reduce the false acceptance rate while maintaining a high accuracy of object detection. In applications as biometrics (e.g., facial recognition) it may be desirable to minimize false acceptance rate as much as possible. In such applications, object detection may be based on majority decoding using multiple image classifiers, in which each image classifier is given a different subset of the input I/Q samples obtained through RF scanning, and object detection is based on the output of the multiple image classifiers (e.g., the object is detected when a majority of the image classifiers detect the object). An example of such a technique is illustrated in FIG. 6.

Figure 6:
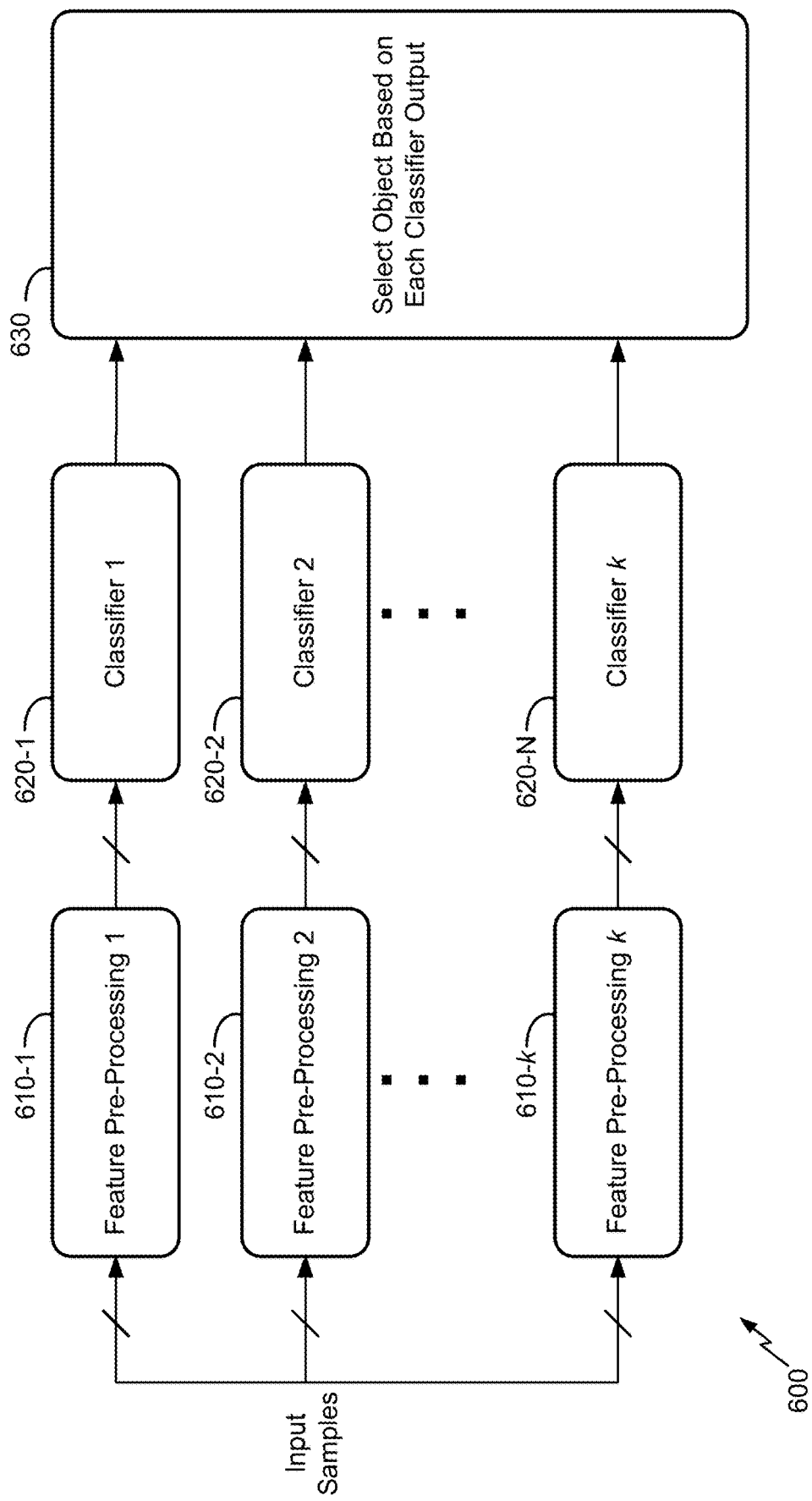
FIG. 6 is a block diagram of a technique in which multiple classifiers may be used to reduce false acceptance rate in object detection based on RF images, according to an embodiment.

FIG. 6 is a block diagram of an object identification architecture 600 in which multiple classifiers may be used to reduce false acceptance rate in object detection based on RF images, according to an embodiment. The architecture 600 can receive the same input samples as is used in FIG. 5. In contrast to FIG. 5, however, input samples are used in k parallel processes. Each process comprises inputting the input samples into feature pre-processing 610, which feeds a respective feature vector to a respective classifier of 620. Similar to FIG. 6, one or more of the functions illustrated in FIG. 6 may be performed by a processing unit (e.g., a digital signal processor (DSP)) of an electronic device, such as the electronic device 1100 illustrated in FIG. 11 and described below.

Feature pre-processing 610 may utilize any of the various techniques of the feature pre-processing 510 illustrated in FIG. 5. Here, however, each feature pre-processing 610 will reduce the input samples in a different way, such that the respective feature vector output by each feature pre-processing 610 will be unique. For example, while each feature pre-processing 610 may ignore the same taps in the input samples, each feature pre-processing 610 may decimate the remaining input samples in a unique way. In one embodiment, for example, each feature pre-processing 610 implements a downsampling process that keeps only every $16^{th}$ input sample, where each feature pre-processing 610 has a different offset. Thus the first feature pre-processing 610-1 may keep 1st, 17th, 33rd, 49th, etc. input samples, the second feature pre-processing 610-2 may keep 2nd, 18th, 34th, 50th, etc. input samples, and other feature pre-processing 610 are offset in a similar manner.

The classifiers 620 may comprise the same or different types of classifiers, depending on desired functionality. In some embodiments, for example, classifiers 620 may each comprise the same random forest model, which may have been trained in the manner as illustrated in FIG. 5. However, because each is provided with a unique feature vector as an input, the output of each classifier 620 may be different. Some classifiers 620 may output that a particular object is detected, while other classifiers my output that a different object is detected, or no object is detected. That said, in some embodiments, classifiers 620 may comprise different classifiers (e.g., differently-trained multi-class random forest models) and/or different classifier types.

At block 630, the output of each classifier may be examined to determine whether an object is detected. According to some embodiments, an object will be deemed to have been detected if a threshold number (e.g., all, a certain percentage, etc.) of the classifiers 620 indicate detection of the object. This threshold number may be increased or decreased to increase or decrease accuracy, as desired.

Figure 7:
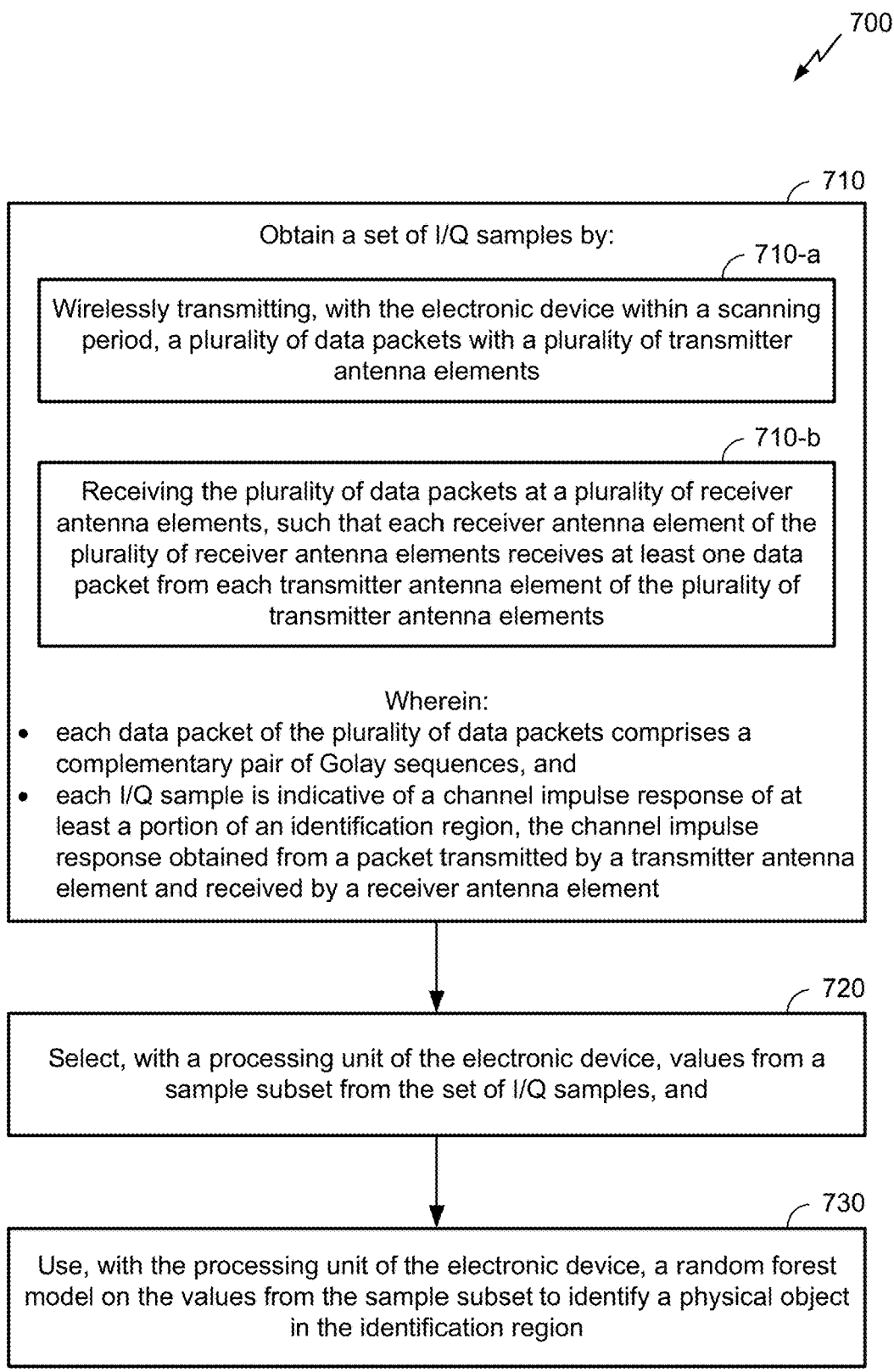
FIG. 7 is a flow diagram illustrating an embodiment of a method of performing object recognition using RF signals at an electronic device.

FIG. 7 is a flow diagram illustrating a method 700 of performing object recognition using RF signals at an electronic device, according to an embodiment. The method 700 captures a portion of the functionality described in the embodiments above and illustrated in FIGS. 1-6. One or more of the functions described in the blocks illustrated in FIG. 7 may be performed by software and/or hardware components (e.g., a digital signal processor (DSP)) of an electronic device, such as the electronic device 1100 illustrated in FIG. 11 and described below. Moreover, a person of ordinary skill in the art will appreciate that alternative embodiments may vary in the way they implement the functions illustrated in FIG. 7 by adding, omitting, combining, separating, and otherwise varying the functions illustrated in the blocks of FIG. 7.

At block 710, the functionality includes obtaining a set of I/Q samples by performing functions shown in blocks 710-$a$ and 710-$b$. At block 710-$a$, the functionality comprises wirelessly transmitting, with the electronic device within a scanning period, a plurality of data packets with a plurality of transmitter antenna elements. At block 710-$b$, the functionality comprises receiving the plurality of data packets at a plurality of receiver antenna elements, such that each receiver antenna element of the plurality of receiver antenna elements receives at least one data packet from each transmitter antenna element of the plurality of transmitter antenna elements. As further noted in block 710, data packet of the plurality of data packets comprises a complementary pair of Golay sequences, and each I/Q sample is indicative of a channel impulse response (CIR) of at least a portion of an identification region, the CIR obtained from a packet transmitted by a transmitter antenna element and received by a receiver antenna element. As noted in the embodiments described above, the transmission and reception of the data packets may vary, depending on desired functionality. The timing of the transmission and reception of the plurality of packets may be such that I/Q samples may represent scans of different distances, or taps, from the electronic device (e.g., as illustrated in FIG. 3). The area of the height, width, and depth scanned during the scanning period may define the identification region in which an object may be identified from the scanning. According to some embodiments, the plurality of transmitter antenna elements may comprise all or a portion of the transmitter antenna elements of a transmitter antenna array (e.g., the transmitter antenna array 204 of FIG. 2). Similarly, the plurality of receiver antenna elements may comprise all or a portion of the receiver antenna elements of a receiver antenna array (e.g., the receiver antenna array 206 of FIG. 2). As noted in FIG. 4 and described above, the transmission of data packets may be sent in bursts, and the duty cycle of packet transmission and/or burst transmission may be adjusted to adjust a length of the scanning period. In some embodiments, the scanning period may be 100 ms or less. In some embodiments, each packet of the plurality packets may be transmitted in 6 μs or less. As noted in the embodiments described above, each packet may comprise a CEF field of a 802.11ad or 802.11ay packet, which may comprise plurality of complementary pairs of Golay sequences. According to some embodiments, the RF signals used to transmit the plurality of data packets may comprise RF signals within the range of 57-64 GHz (e.g., the 60 GHz frequency band).

Figure 11:
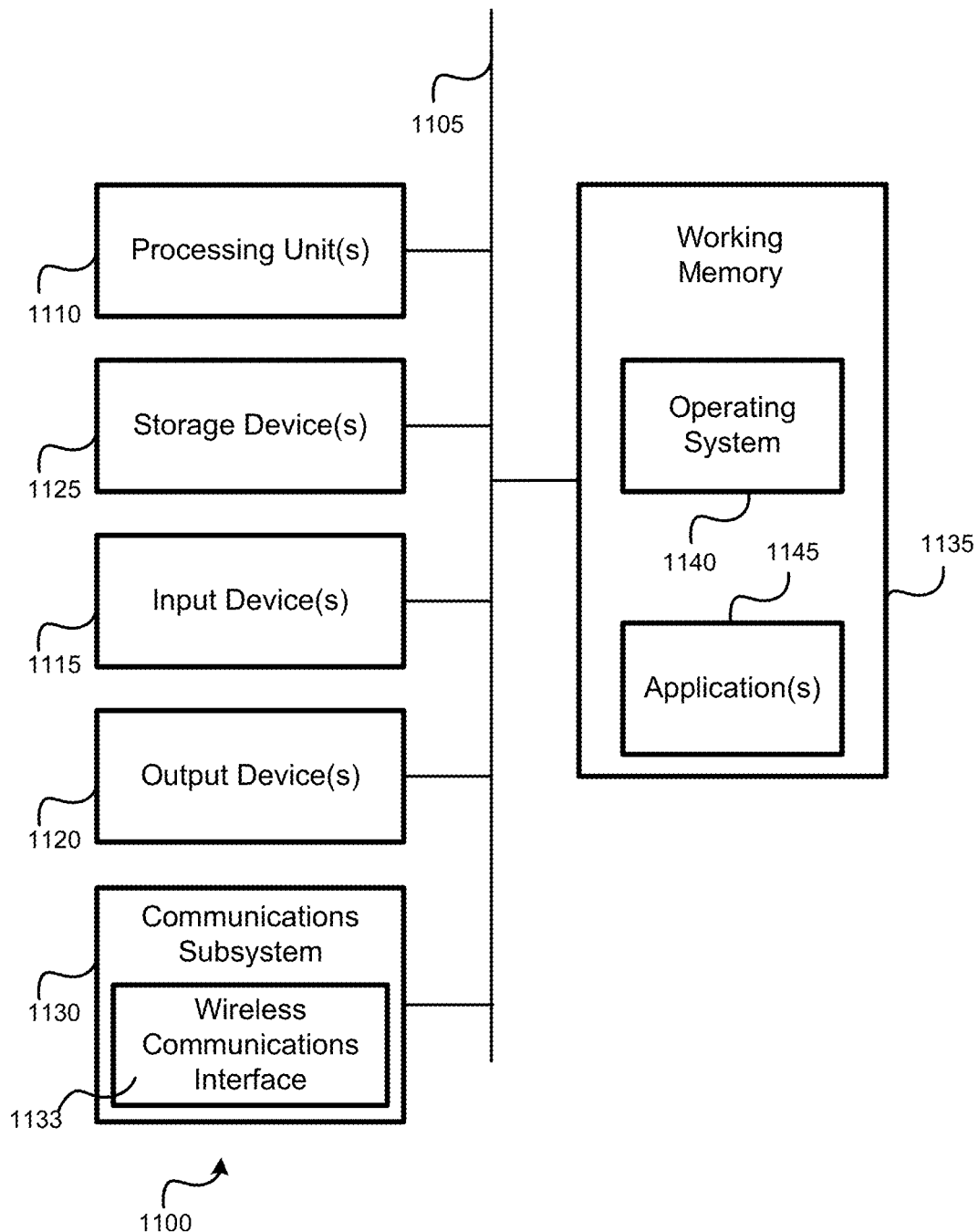
FIG. 11 is block diagram of an electronic device, according to an embodiment.

Means for performing the functionality at block 710 may include, for example, a bus 1105, processing unit(s) 1110, memory 1135, communications subsystem 1130 (including wireless communication interface 1133), and/or other hardware and/or software components of an electronic device 1100 as illustrated in FIG. 11 and described in further detail below.

At block 720, the functionality includes selecting, with a processing unit of the electronic device, values from a sample subset from the set of I/Q samples. As described with regard to FIG. 5 above, the selection of values from a sample subset may comprise one or more of a variety of preprocessing techniques. According to some embodiments, for example, selecting values from the sample subset includes performing PCA on the set of I/Q samples and choosing the sample subset from the set of I/Q samples based on a result of the PCA. In some embodiments, selecting values from the sample subset may be based on a physical distance, from the electronic device, sampled by the sample subset. For example, certain taps of an RF image may be ignored or selected, based on distance from the electronic device. In some embodiments, selecting values from the sample subset may comprise decimation by downsampling the set of I/Q samples. Selecting values from the sample subset may additionally or alternatively comprise converting complex I/Q values to real values.

Means for performing the functionality at block 720 may include, for example, a bus 1105, processing unit(s) 1110, memory 1135, and/or other hardware and/or software components of an electronic device 1100 as illustrated in FIG. 11 and described in further detail below.

At block 730, the functionality comprises using, with the processing unit of the electronic device, a random forest model on the selected values from sample subset to identify a physical object in the identification region. As previously noted, the techniques provided herein may be utilized for facial recognition. As such, the physical object may comprise a face. In some embodiments, the random forest model may comprise a multi-class classifier, which may be trained using both positive and negative samples. That is, in a training process of the random forest model (e.g., the training process illustrated in FIG. 5) input samples used to train the random forest model may comprise values from RF images of both positive images (images of an object to be identified) and negative images (images without an object to be identified). Alternative embodiments, described in more detail below, may utilize single-class classifiers and/or positive-only image sets for training.

As noted in FIG. 6, multiple classifiers may be provided different subsets of the I/Q samples, which may result in object identification with a relatively low false identification rate. Thus, using a random forest model as described in block 630 may comprise using the random forest model on values from different subsets of the set of I/Q samples, and identifying the physical object may be based on an output of the random forest model for each of the different subsets of the set of I/Q samples. Depending on desired functionality, this may be done in parallel (e.g., using multiple instances of the random forest model at the same time on the different subsets), or in sequence.

Means for performing the functionality at block 730 may include, for example, a bus 1105, processing unit(s) 1110, memory 1135, and/or other hardware and/or software components of an electronic device 1100 as illustrated in FIG. 11 and described in further detail below.

One-Class Autoencoder

In some scenarios it may be desirous to use only positive data to train an RF-based object recognition system of an electronic device to recognize an object. It scenarios in which an electronic device (e.g., a mobile phone) may be used by a single user, for example, training for facial recognition of the user may be simplified by using RF images of the user (e.g., rather than using RF images of non-users as negative data). Embodiments may accommodate such scenarios by utilizing an RF-based object recognition system that comprises a one-class autoencoder using techniques described herein below. As used herein, "positive data" may refer to training data (e.g., input samples from an RF image of an object to be detected) that are configured to train a machine learning classifier to generate a positive classification result, whereas "negative data" may refer to training data (e.g., input samples from an RF image without the object to be detected) that are configured to train the machine learning classifier to generate a negative classification result.

It can be noted that autoencoders in the embodiments described in the embodiments that follow may be based on any of a variety of machine-learning technologies, such as neural networks, random forest, support vector machine (SVM), principle component analysis (PCA) etc. Moreover, some embodiments may even employ multiple types of machine-learning technologies. Additionally, similar to embodiments of an RF-based object recognition system employing a multi-class random forest classifier described above, embodiments of an RF-based object recognition system employing a one-class autoencoder may also be implemented, at least in part, using software instructions executed on a hardware microprocessor, a graphics processing unit (GPU) or other hardware accelerator, etc. In some examples, an RF-based object recognition system can be implemented as an application-specific integrated circuit (ASIC), field-programmable gate array (FPGA), etc. such software and hardware components may be Incorporated into a larger device, such as the electronic device illustrated in FIG. 11 and described in further detail below.

The ability to use using only positive data to perform one-class classification may provide a variety of benefits. As previously noted, the training can become self-contained (e.g., using only the image data of the target user) and without the need for any external data (e.g., image data of other users/people). The training also does not require any process or module calibration, as one-class can be used to train the autoencoder to detect a specific object. The training also does not require anything measured in the lab or anything pre-trained in the cloud. All these can improve the protection of privacy and security, and can reduce the risk of exposing sensitive data in a cloud environment. Moreover, the use of RF images for object identification may allow for the use of a simplified autoencoder. That is, because adjacent samples in a radar image 10 to be more diverse than the adjacent pixels in a camera image, there is less of a need for a convolutional layer than in camera-based solutions.

Figure 8A:
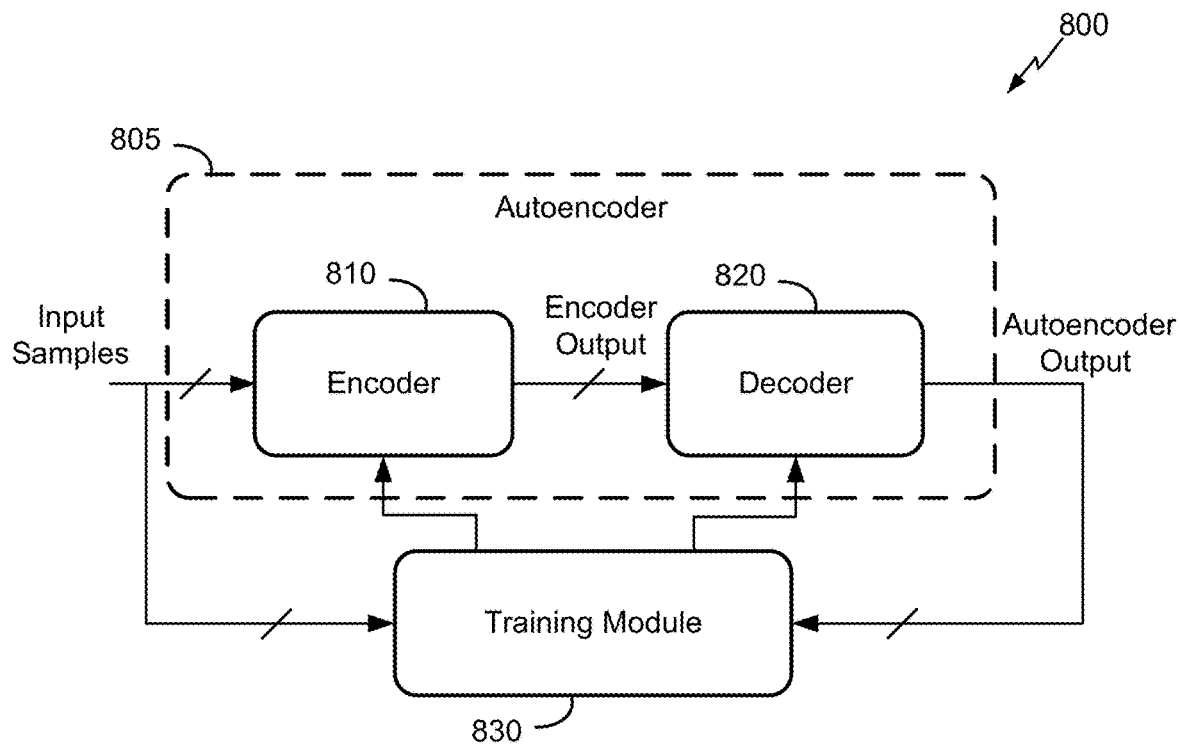
FIG. 8A illustrates an example of a machine learning training architecture that can be used to train an autoencoder for use in a RF-based object recognition system, according to an embodiment.

FIG. 8A illustrates an example of a machine learning training architecture 800-A that can be used to train an autoencoder 805 for use in a RF-based object recognition system, according to an embodiment. As with other training techniques provided herein, training may be conducted by a manufacturer of a device in which the RF-based object recognition system is used, in which case the resulting trained autoencoder 805 may be incorporated into the device upon manufacture and/or subsequently uploaded to devices already in use. Additionally or alternatively, training may be conducted by an end-user of a device in which the RF-based object recognition system is used, in which case the trained autoencoder 805 may be implemented locally to the device for object recognition using the device.

In brief, the autoencoder 805 comprises an encoder 810 and a decoder 820. Input samples (e.g., complex I/Q samples of an RF image and/or real values derived therefrom) provided at the input of the autoencoder 805 are processed by the encoder 810. The encoder 810 operates to reduce the amount of data received at the input. In other words, if the input samples are included in a input feature vector, the encoder 810 operates to reduce the dimensionality of the input feature vector. The encoder output, then, is a reduced-dimensionality feature vector having fewer features than that of the input feature vector.

The decoder 820 then operates to reconstruct the original feature vector based on receiving the reduced-dimensionality feature vector as an input and executing a process similar to the encoder. A person of ordinary skill in the art will appreciate the various ways in which an encoder 810 and decoder 820 of the autoencoder 805 may be implemented.

The functionality of the autoencoder 805 can be described mathematically as follows. The encoder 810 may perform an encoder function, $\varphi$, on an input (the input samples). The decoder 820 then performs a decoder function, $\phi$, on the encoder output. Thus, the autoencoder output (the output of the decoder 820) may be expressed with respect to the input as follows:

$$\text{output} = (\varphi \circ \phi) \text{input} \qquad \text{(Expression 2)}$$

The parameters of encoder function $\varphi$ and decoder function $\phi$ can be trained by a training module 830, based on a loss function that compares input samples with decoder output. The training module 830 may be configured to adjust the encoder 810 and/or decoder 820 functions to minimize the value of the loss function.

In some embodiments, the loss function may comprise the mean square error between the (input samples) and the output (autoencoder output). The training can therefore be performed with the objective of minimizing, for example, the means square errors between the set of input samples and the set of corresponding outputs, as follows:

$$\underset{\varphi,\phi}{\text{argmin}} \|\text{input} - (\varphi \cdot \phi)\text{input}\|^2 \qquad \text{(Expression 3)}$$

In Expression 3, "argmin" can refer to the parameters of encoder function $\varphi$ and decoder function $\phi$ that minimizes the means square errors between the input samples ("input" in Expression 3) and the corresponding autoencoder output ("$\varphi \circ \phi$)input" in Expression 3). As previously noted, input samples of an RF image may comprise or be derived from pixel data represented in the format of Expression 1.

Figure 8B:
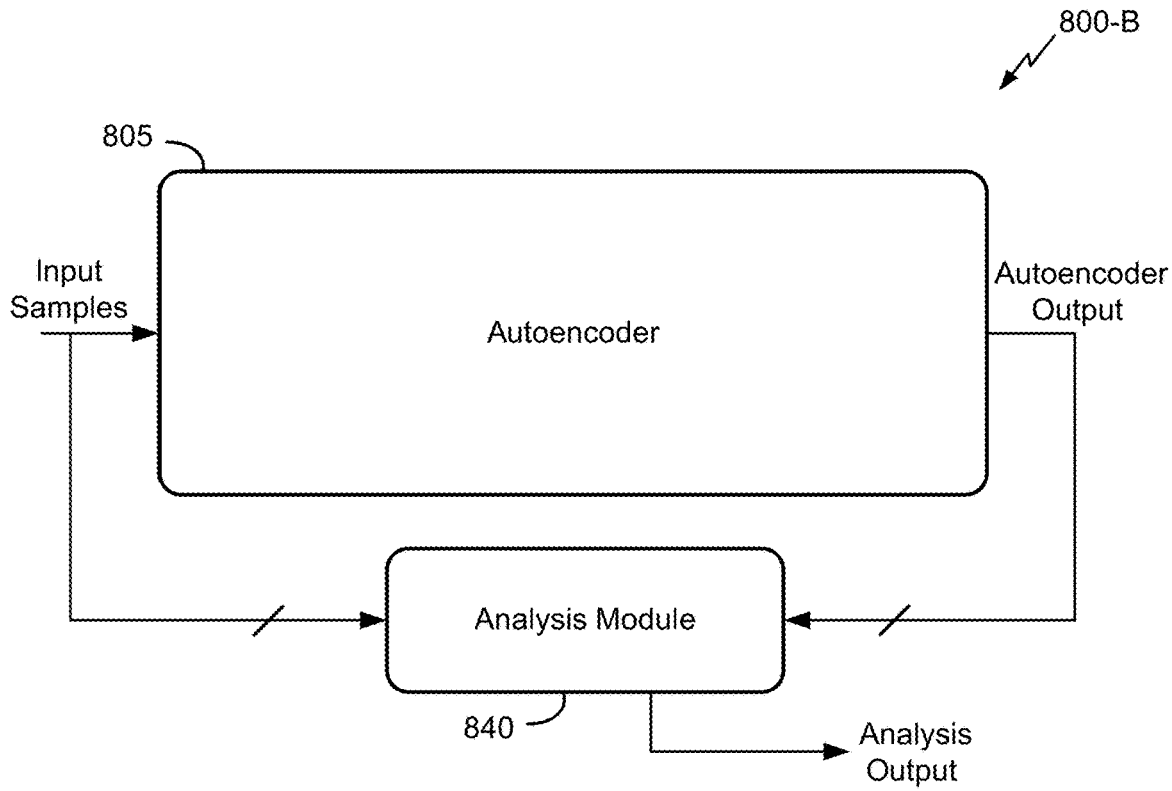
FIG. 8B illustrates an example of a machine learning object recognition architecture that can use a trained autoencoder for RF-based object recognition, according to an embodiment.

FIG. 8B illustrates an example of a machine learning object recognition architecture 800-B that can use a trained autoencoder 805 for RF-based object recognition, according to an embodiment. As noted above, the autoencoder 805 may be trained on a device separate from the device in which RF-based object recognition is used. In other embodiments, both training and use of the autoencoder 805 may be implemented on the same device. In such cases, the analysis module 840 may be used in parallel with and/or may be incorporated into the training module 830 of FIG. 8A.

For object recognition, the analysis module 840 can operate similar to the training module 830 of FIG. 8A in that it may compare input samples with autoencoder output. Here, however, the analysis module 840 can provide an analysis output, indicating whether an object has been identified. More specifically, the analysis module 840 can compare the loss function (e.g., Expression 3) between the input samples and the autoencoder output to determine whether the a value of the output of the loss function falls below a certain threshold. (This threshold may be determined during training, and may be based on values of the output of the loss function determined for input samples of RF images including the object.)

Figure 9:
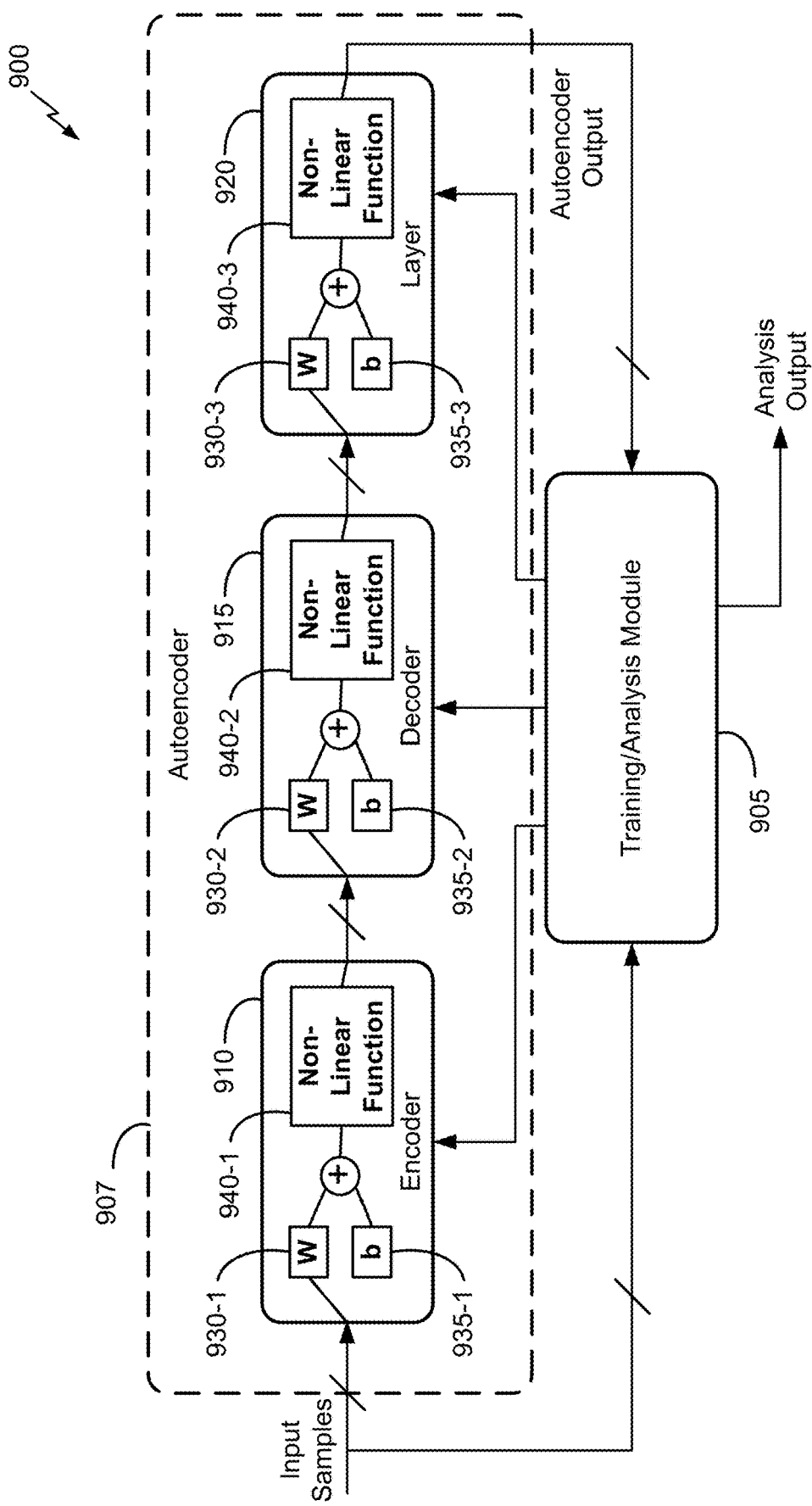
FIG. 9 is a block diagram of a combined machine learning training and object recognition architecture, according to an embodiment.

FIG. 9 is a block diagram of a combined machine learning training and object recognition architecture 900. Here, the architecture is similar to those of FIGS. 8A-8B, however the training/analysis module 905 performs the functions of both the training module 830 of FIG. 8A and analysis module 840 of FIG. 8B, thereby allowing the architecture to be used for both training of the autoencoder 907 and subsequent use in object identification.

Here, the autoencoder 907 employees an artificial neural network that includes not only an encoder 910 and decoder 915, but also an additional hidden layer 920. As a person of ordinary skill in the art will appreciate, the addition of layer 920 may provide additional accuracy. As such, alternative embodiments may include additional hidden layers, or may omit layer 920, depending on desired accuracy, processing requirements, the size of the input feature vector (e.g., the number of input samples) and/or other factors. The layer 920 may be trained with the training/analysis module 905 in a manner similar to the training of the encoder 910 and decoder 915 (e.g., as described above with regard to FIGS. 8A-8B).

Each layer of the autoencoder 907, including encoder 910, decoder 915, and layer 920, may include a number of neurons, each having a set of weights 930 and biases 935, which are combined and provided as input to a nonlinear function 940. Although illustrated as having a single neuron each, each layer may have any number of neurons (e.g., 16, 48, 256, 512, etc.), which may again depend on desired accuracy, processing requirements, the size of the input feature vector (e.g., the number of input samples) and/or other factors.

Figure 10:
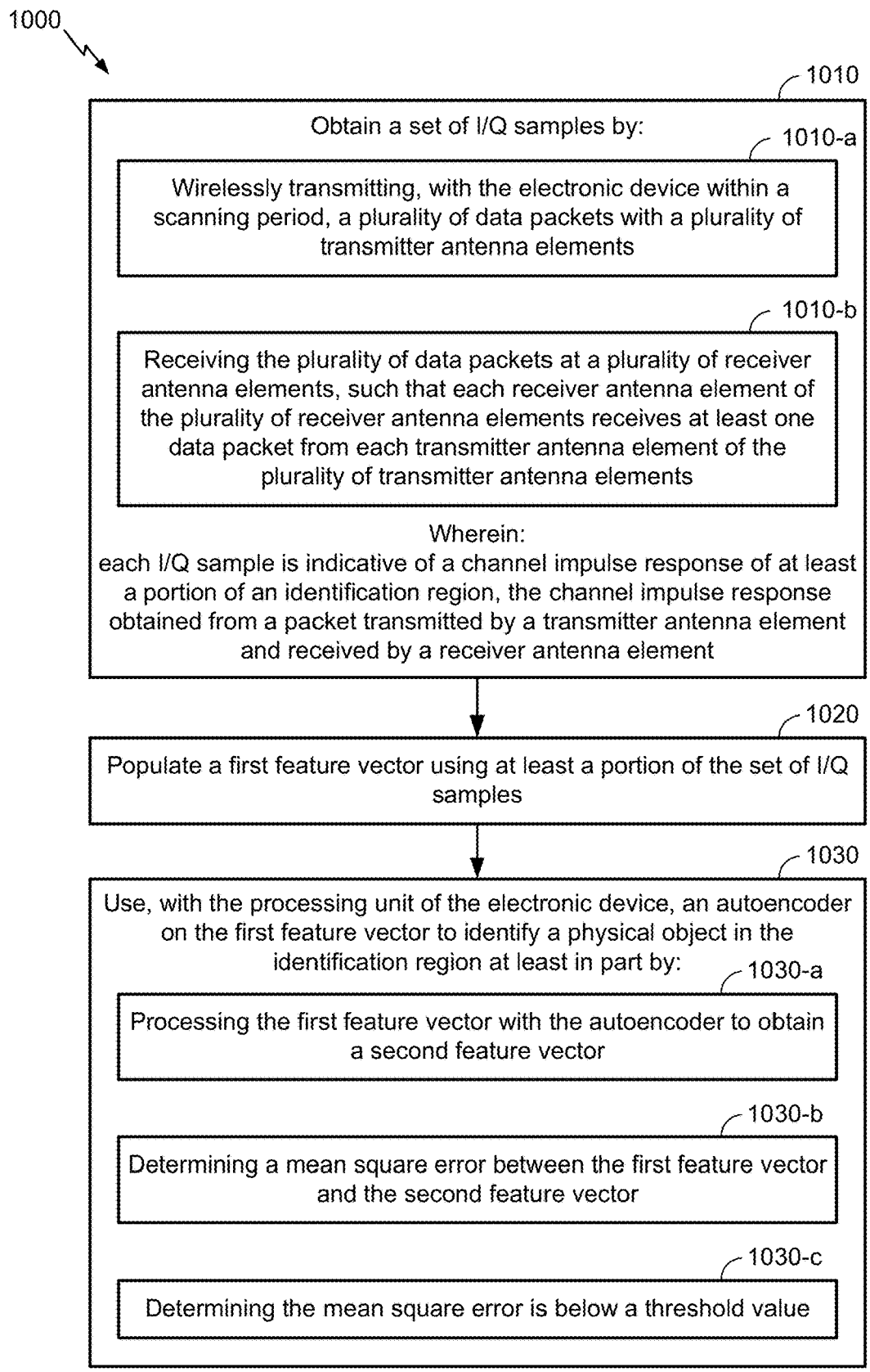
FIG. 10 is a flow diagram of a method of performing object recognition using RF signals at an electronic device, according to an embodiment.

FIG. 10 is a flow diagram of a method 1000 of performing object recognition using RF signals at an electronic device, according to an embodiment. The method 1000 captures a portion of the functionality described in the embodiments above and illustrated in FIGS. 1-4 and 8A-9, and may be considered an alternative embodiment to the method 700 of FIG. 7. As with the method 700 of FIG. 7, one or more of the functions described in the blocks illustrated in FIG. 10 may be performed by software and/or hardware components (e.g., a digital signal processor (DSP)) of an electronic device, such as the electronic device illustrated in FIG. 11 and described below. Moreover, a person of ordinary skill in the art will appreciate that alternative embodiments may vary in the way they implement the functions illustrated in FIG. 10 by adding, omitting, combining, separating, and otherwise varying the functions illustrated in the blocks of FIG. 10.

At block 1010, the functionality includes obtaining a set of I/Q samples by performing the functions described at blocks 1010-a and 1010-b. The functionality of block 1010-a includes wirelessly transmitting, with the electronic device within a scanning period, a plurality of data packets with a plurality of transmitter antenna elements. At block 1010-b, the functionality includes receiving the plurality of data packets at a plurality of receiver antenna elements, such that each receiver antenna element of the plurality of receiver antenna elements receives at least one data packet from each transmitter antenna element of the plurality of transmitter antenna elements. As further noted in block 1010, each I/Q sample is indicative of a channel impulse response of at least a portion of an identification region, the channel impulse response obtained from a packet transmitted by a transmitter antenna element and received by a receiver antenna element. As noted in the embodiments described above, the transmission and reception of the data packets may vary, depending on desired functionality. The timing of the transmission and reception of the plurality of packets may be such that I/Q samples may represent scans of different distances, or taps, from the electronic device (e.g., as illustrated in FIG. 3). The area of the height, width, and depth scanned during the scanning period may define the identification region in which an object may be identified from the scanning. According to some embodiments, the plurality of transmitter antenna elements may comprise all or a portion of the transmitter antenna elements of a transmitter antenna array (e.g., the transmitter antenna array 204 of FIG. 1). Similarly, the plurality of receiver antenna elements may comprise all or a portion of the receiver antenna elements of a receiver antenna array (e.g., the receiver antenna array 206 of FIG. 1). As noted in FIG. 4 and described above, the transmission of data packets may be sent in bursts, and the duty cycle of packet transmission and/or burst transmission may be adjusted to adjust a length of the scanning period. In some embodiments, the scanning period may be 100 μs or less. In some embodiments, each packet of the plurality packets may be transmitted in 6 μs or less. As noted in the embodiments described above, each packet may comprise a CEF field of a 802.11ad or 802.11ay packet, which may comprise one or more complementary pairs of Golay sequences. According to some embodiments, the RF signals used to transmit the plurality of data packets may comprise RF signals within the range of 57-64 GHz (e.g., the 60 GHz frequency band).

Means for performing the functionality at block 1010 may include, for example, a bus 1105, processing unit(s) 1110, memory 1135, communications subsystem 1130 (including wireless communication interface 1133), and/or other hardware and/or software components of an electronic device 1100 as illustrated in FIG. 11 and described in further detail below.

At block 1020, the functionality includes populating a first feature vector using at least a portion of the I/Q samples. As noted above, one or more of a variety of pre-processing may be performed on I/Q samples to select a portion of the I/Q samples to use for object identification. Some embodiments, for example, may comprise selecting the at least a portion of the I/Q samples from the set of I/Q samples based on a physical distance, from the electronic device, sampled by the at least a portion of the I/Q samples. Additionally or alternatively, embodiments may select the at least a portion of the set of I/Q samples at least in part by downsampling the set of I/Q samples According to some embodiments, the features of the feature vector may include the I/Q samples themselves, which may be formatted as shown in Expression 1 above. In some embodiments, I/Q samples may represent complex numbers, which may be converted to real numbers prior to populating the first feature vector.

Means for performing the functionality at block 1020 may include, for example, a bus 1105, processing unit(s) 1110, memory 1135, and/or other hardware and/or software components of an electronic device 1110 as illustrated in FIG. 11 and described in further detail below.

At block 1030, an autoencoder is used on the first feature vector to identify a physical object in the identification region at least in part by performing functions 1030-*a* to 1030-*c*. The function at 1030-*a* comprises processing the first feature vector with the autoencoder to obtain a second feature vector. The function at 1030-*b* comprises determining a mean square error between the first feature vector and the second feature vector. And the function at 1030-*c* comprises determining the mean square error is below a threshold value. As mentioned previously, embodiments may be used for facial recognition. And thus, in some embodiments, the object may comprise a face. In some embodiments the autoencoder comprises a one-class classifier, which may have been trained using only positive training samples. The autoencoder itself may use one or more machine-learning technologies, including a neural network, a random forest model, a support vector machine (SVM), or principle component analysis (PCA), or any combination thereof.

Means for performing the functionality at block 1030 may include, for example, a bus 1105, processing unit(s) 1110, memory 1135, and/or other hardware and/or software components of an electronic device 1110 as illustrated in FIG. 11 and described in further detail below.

FIG. 11 illustrates an embodiment of an electronic device 1100, which may incorporate an RF-based object recognition system comprising a RF imaging component and machine-learning component (e.g., a multi-class random forest classifier and/or one-class autoencoder) as described in the embodiments above. FIG. 11 provides a schematic illustration of one embodiment of an electronic device 1100 that can perform the methods provided by various other embodiments, such as the methods described in FIGS. 7 and 10. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different physical or geographical locations. The electronic device 1100 may correspond with the electronic device 105 of FIG. 1 or may comprise and/or be incorporated into any of a variety of devices, including a mobile phone, tablet, personal computer (PC), laptop, security device (e.g., camera, floodlight, etc.), and/or the like.

The electronic device 1100 is shown comprising hardware elements that can be electrically coupled via a bus 1105 (or may otherwise be in communication, as appropriate). The hardware elements may include processing unit(s) 1110, which can include without limitation one or more general-purpose processors, one or more special-purpose processors (such as a DSP, GPU, ASIC, FPGA, and/or the like), and/or other processing structure, which can be configured to perform one or more of the methods described herein, including the method described in relation to FIGS. 7 and 10. The electronic device 1100 also can include one or more input devices 1115, which can include without limitation a mouse, a keyboard, a camera, a microphone, and/or the like; and one or more output devices 1120, which can include without limitation a display device, a printer, and/or the like.

The electronic device 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The electronic device 1100 may also include a communications subsystem 1130, which can include support of wireline communication technologies and/or wireless communication technologies (in some embodiments) managed and controlled by a wireless communication interface 1133. The communications subsystem 1130 may include a modem, a network card (wireless or wired), an infrared communication device, a wireless communication device, and/or a chipset, and/or the like. The communications subsystem 1130 may include one or more input and/or output communication interfaces, such as the wireless communication interface 1133, to permit data and signaling to be exchanged with a network, mobile devices, other computer systems, and/or any other electronic devices described herein. As previously noted, and RF imaging component 200 (as illustrated in FIG. 2) may be incorporated into a wireless communications interface 1133 such that antenna elements in a transmitter antenna array 204 and receiver antenna array 206, and the circuitry connected with the antenna elements, may be used for both RF imaging and data communication. For example, in some embodiments, the wireless communication interface 1133 may comprise a 802.11ad- and/or 802.11ay-compatible modem capable of both RF imaging and data communication.

In many embodiments, the electronic device 1100 will further comprise a working memory 1135, which can include a RAM and/or or ROM device. Software elements, shown as being located within the working memory 1135, can include an operating system 1140, device drivers, executable libraries, and/or other code, such as application(s) 1145, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 7 and 10, may be implemented as code and/or instructions that are stored (e.g. temporarily) in working memory 1135 and are executable by a computer (and/or a processing unit within a computer such as processing unit(s) 1110); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as electronic device 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 1100 and/or might take the form of source and/or installable code, which, upon compilation and/or installation on the electronic device 1100 (e.g., using any of a variety of generally available compilers, installation programs, compression/decompression utilities, etc.), then takes the form of executable code.

Figure 12:
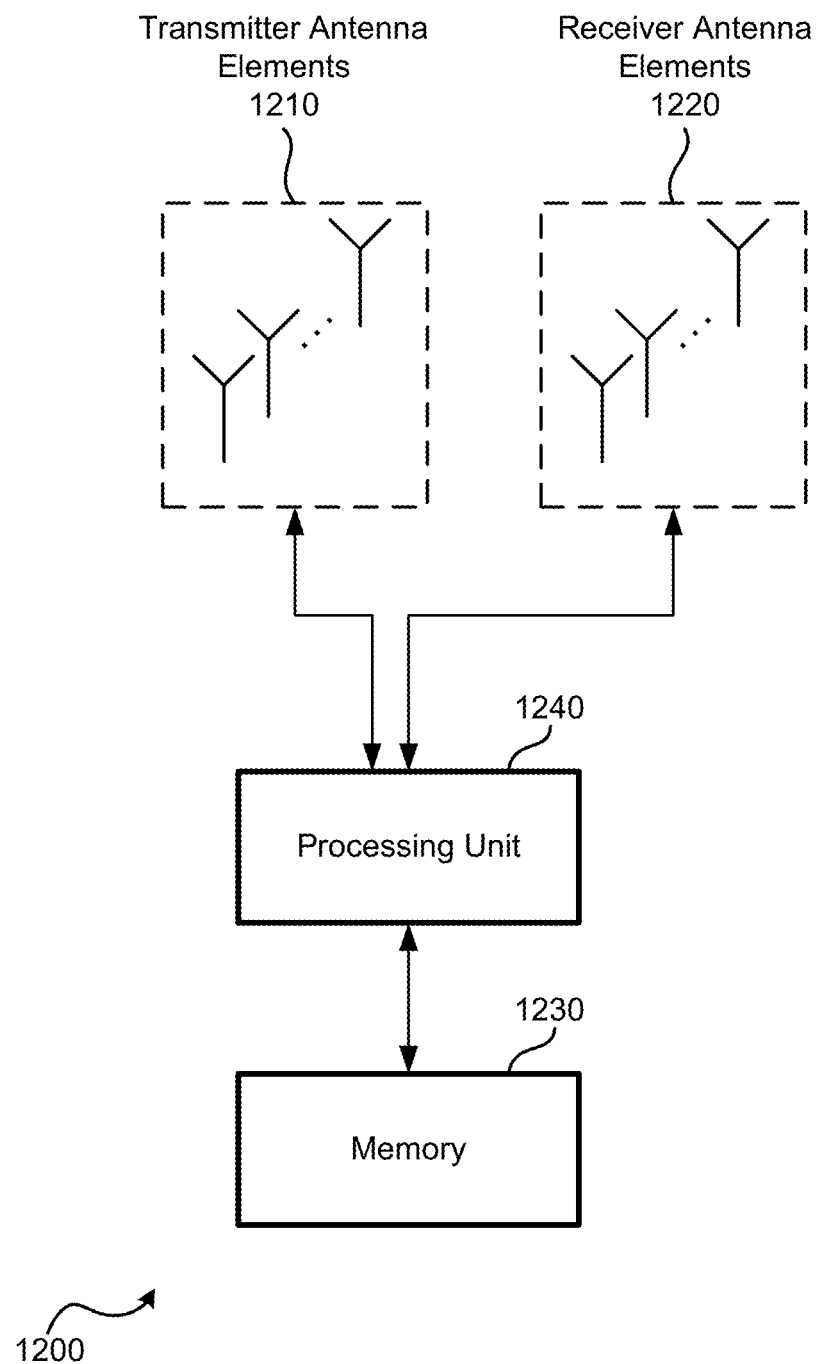
FIG. 12 is a block diagram of an embodiment of an electronic device, according to another embodiment.

FIG. 12 illustrates an embodiment of an electronic device 1200, according to another embodiment. In contrast to the electronic device 1100 of FIG. 11, which may function as a more general purpose device, electronic device 1200 of FIG. 12 illustrates a more basic set of components that may be utilized to perform RF-based object recognition as described in the embodiments above. These components include transmitter antenna elements 1210, receiver antenna elements 1220, memory 1230, and processing unit 1240. Again, it should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different physical or geographical locations. The electronic device 1200 may correspond with the electronic device 105 of FIG. 1 or may comprise and/or be incorporated into any of a variety of devices, including a mobile phone, tablet, personal computer (PC), laptop, security device (e.g., camera, floodlight, etc.), and/or the like.

Here, the processing unit 1240 may comprise without limitation one or more general-purpose processors, one or more special-purpose processors (such as a DSP, GPU, ASIC, FPGA, and/or the like), and/or other processing structure. The memory may comprise a RAM, ROM, or other computer-readable medium (similar to working memory 1135), and may comprise software and/or other computer code that may be executed by the processing unit 1240 to perform one or more of the methods described herein, including the method described in relation to FIGS. 7 and 11. As such, the processing unit 1240 and various other components may implement RF imaging and machine-learning functionality (e.g., a multi-class random forest classifier and/or one-class autoencoder) as described in the embodiments above.

Transmitter antenna elements 1210 and/or receiver antenna elements 1220 may comprise antenna elements in one or more antenna arrays. For example, transmitter antenna elements 1210 may be incorporated into a transmitter antenna array (e.g., transmitter antenna array 204 of FIG. 2), and receiver antenna elements 1220 may be incorporated into a receiver antenna array (e.g., receiver antenna array 206 of FIG. 2).

In some embodiments, one or more of the components illustrated in FIG. 12 may be incorporated into an integrated circuit, motherboard, daughter board, or other that maybe component utilized by a larger electronic device. For example, the components illustrated in FIG. 12 may comprise subcomponents of a modem or other wireless communications interface, and/or may be incorporated into a radar sensor that may not have data communications functionality.

It can be noted that, although particular frequencies, integrated circuits (ICs), hardware, and other features are described in the embodiments herein, alternative embodiments may vary. That is, alternative embodiments may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., mobile phones, tablets, personal computer (PC), etc.), and/or other features. A person of ordinary skill in the art will appreciate such variations.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of performing object recognition using radio frequency (RF) signals at an electronic device, the method including:
    obtaining a set of I/Q samples by wirelessly transmitting, with the electronic device within a scanning period, a plurality of data packets with a plurality of transmitter antenna elements and receiving the plurality of data packets at a plurality of receiver antenna elements, such that each receiver antenna element of the plurality of receiver antenna elements receives at least one data packet from each transmitter antenna element of the plurality of transmitter antenna elements, wherein:
        each data packet of the plurality of data packets comprises a complementary pair of Golay sequences, and
        each I/Q sample is indicative of a channel impulse response of at least a portion of an identification region, the channel impulse response obtained from a packet transmitted by a transmitter antenna element and received by a receiver antenna element;
    selecting, with a processing unit of the electronic device, values from a sample subset from the set of I/Q samples, wherein selecting the values from the sample subset includes performing Principal Component Analysis (PCA) on the set of I/Q samples and choosing the sample subset from the set of I/Q samples based on a result of the PCA; and
    using, with the processing unit of the electronic device, a random forest model on the selected values from the sample subset to identify a physical object in the identification region.

2. The method of claim 1, wherein the physical object comprises a face.

3. The method of claim 1, wherein selecting the sample subset is based on a physical distance, from the electronic device, sampled by the sample subset.

4. The method of claim 1, wherein selecting the sample subset comprises downsampling the set of I/Q samples.

5. The method of claim 1, wherein using the random forest model includes using the random forest model on different subsets of the set of I/Q samples, and identifying the physical object is based on an output of the random forest model for each of the different subsets of the set of I/Q samples.

6. The method of claim 1, wherein the random forest model comprises a multi-class classifier trained using positive and negative RF images.

7. The method of claim 1, wherein the plurality of data packets are wirelessly transmitted by the plurality of transmitter antenna elements using RF signals within a range of 57-64 GHz.

8. The method of claim 1, wherein the scanning period is 100 ms or less.

9. The method of claim 1, wherein each packet of the plurality of data packets is transmitted in 6 µs or less.

10. The method of claim 1, further comprising adjusting a length of the scanning period to accommodate a time during which the electronic device is used for data communication.

11. An electronic device comprising:
a plurality of transmitter antenna elements;
a plurality of receiver antenna elements;
a memory; and
a processing unit communicatively coupled with the plurality of transmitter antenna elements, the plurality of receiver antenna elements, and the memory, wherein the processing unit is configured to:
obtain a set of I/Q samples by wirelessly transmitting, within a scanning period, a plurality of data packets with the plurality of transmitter antenna elements and receiving the plurality of data packets at the plurality of receiver antenna elements, such that each receiver antenna element of the plurality of receiver antenna elements receives at least one data packet from each transmitter antenna element of the plurality of transmitter antenna elements, wherein:
each data packet of the plurality of data packets comprises a complementary pair of Golay sequences, and
each I/Q sample is indicative of a channel impulse response of at least a portion of an identification region, the channel impulse response obtained from a packet transmitted by a transmitter antenna element and received by a receiver antenna element;
select from a sample subset from the set of I/Q samples, wherein the processing unit is configured to select the values from the sample subset at least in part by performing Principal Component Analysis (PCA) on the set of I/Q samples and choosing the sample subset from the set of I/Q samples based on a result of the PCA; and
use a random forest model on the selected values from the sample subset to identify a physical object in the identification region.

12. The electronic device of claim 11, wherein the electronic device is configured to identify physical objects comprising faces.

13. The electronic device of claim 11, wherein the processing unit is configured to select the sample subset based on a physical distance, from the electronic device, sampled by the sample subset.

14. The electronic device of claim 11, wherein the processing unit is configured to select the sample subset at least in part by downsampling the set of I/Q samples.

15. The electronic device of claim 11, wherein the processing unit is configured to use the random forest model at least in part by using the random forest model on different subsets of the set of I/Q samples, and wherein the processing unit is further configured to identify the physical object based on an output of the random forest model for each of the different subsets of the set of I/Q samples.

16. The electronic device of claim 11, wherein the random forest model comprises a multi-class classifier trained using positive and negative RF images.

17. The electronic device of claim 11, wherein plurality of transmitter antenna elements are configured to wirelessly transmit the plurality of data packets using RF signals within a range of 57-64 GHz.

18. The electronic device of claim 11, wherein the electronic device is configured to transmit the plurality of data packets such that the scanning period is 100 ms or less.

19. The electronic device of claim 11, wherein the electronic device is configured to transmit the plurality of data packets such that each packet of the plurality of data packets is transmitted in 6 μs or less.

20. The electronic device of claim 11, wherein the processing unit is further configured to adjust a length of the scanning period to accommodate a time during which the electronic device is used for data communication.

21. A device comprising:
means for obtaining a set of I/Q samples by wirelessly transmitting, within a scanning period, a plurality of data packets with a plurality of transmitter antenna elements and receiving the plurality of data packets at a plurality of receiver antenna elements, such that each receiver antenna element of the plurality of receiver antenna elements receives at least one data packet from each transmitter antenna element of the plurality of transmitter antenna elements, wherein:
each data packet of the plurality of data packets comprises a complementary pair of Golay sequences, and
each I/Q sample is indicative of a channel impulse response of at least a portion of an identification region, the channel impulse response obtained from a packet transmitted by a transmitter antenna element and received by a receiver antenna element;
means for selecting values from a sample subset from the set of I/Q samples, wherein the means for selecting the values from the sample subset includes means for performing Principal Component Analysis (PCA) on the set of I/Q samples and choosing the sample subset from the set of I/Q samples based on a result of the PCA; and
means for using a random forest model on the selected values from the sample subset to identify a physical object in the identification region.

22. The device of claim 21, wherein the means for selecting the sample subset comprise means for downsampling the set of I/Q samples.

23. The device of claim 21, wherein the means for using the random forest model include means for using the random forest model on different subsets of the set of I/Q samples and means for identifying the physical object based on an output of the random forest model for each of the different subsets of the set of I/Q samples.

24. The device of claim 21, wherein the random forest model comprises a multi-class classifier trained using positive and negative RF images.

25. The device of claim 21, wherein further comprising means for transmitting the plurality of data packets by the plurality of transmitter antenna elements using RF signals within a range of 57-64 GHz.

26. The device of claim 21, wherein further comprising means for adjusting a length of the scanning period to accommodate a time during which the device is used for data communication.

27. A non-transitory computer-readable medium having instructions embedded thereon for performing object recognition using radio frequency (RF), wherein the instructions, when executed one or more processing units, cause the one or more processing units to:
obtain a set of I/Q samples by wirelessly transmitting, with a electronic device within a scanning period, a plurality of data packets with a plurality of transmitter antenna elements and receiving the plurality of data packets at a plurality of receiver antenna elements, such that each receiver antenna element of the plurality of receiver antenna elements receives at least one data packet from each transmitter antenna element of the plurality of transmitter antenna elements, wherein:
each data packet of the plurality of data packets comprises a complementary pair of Golay sequences, and each I/Q sample is indicative of a channel impulse response of at least a portion of an identification region, the channel impulse response obtained from a packet transmitted by a transmitter antenna element and received by a receiver antenna element;

select values from a sample subset from the set of I/Q samples, wherein the values are selected from the sample subset by performing Principal Component Analysis (PCA) on the set of I/Q samples and choosing the sample subset from the set of I/Q samples based on a result of the PCA; and use a random forest model on the selected values from the sample subset to identify a physical object in the identification region.

* * * * *